United States Patent
Jung et al.

(10) Patent No.: US 10,380,396 B2
(45) Date of Patent: Aug. 13, 2019

(54) ELECTRONIC DEVICE HAVING FINGERPRINT SENSOR

(71) Applicant: SAMSUNG ELECTRONICS CO., LTD., Suwon-si, Gyeonggi-do (KR)

(72) Inventors: Jihyun Jung, Yongin-si (KR); Daekwang Jung, Suwon-si (KR); Woohyek Choi, Yongin-si (KR); Shiyun Cho, Anyang-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 69 days.

(21) Appl. No.: 15/659,949

(22) Filed: Jul. 26, 2017

(65) Prior Publication Data
US 2018/0039815 A1 Feb. 8, 2018

(30) Foreign Application Priority Data
Aug. 3, 2016 (KR) .................. 10-2016-0098796

(51) Int. Cl.
*G06K 9/00* (2006.01)
*G06F 3/041* (2006.01)
*G06F 3/044* (2006.01)

(52) U.S. Cl.
CPC ......... *G06K 9/00013* (2013.01); *G06F 3/041* (2013.01); *G06F 3/044* (2013.01); *G06K 9/0002* (2013.01)

(58) Field of Classification Search
CPC .. G06K 9/00013; G06K 9/0002; G06F 3/041; G06F 3/044
See application file for complete search history.

(56) References Cited

U.S. PATENT DOCUMENTS

2013/0287274 A1 10/2013 Shi et al.
2014/0103943 A1 4/2014 Dunlap et al.
(Continued)

FOREIGN PATENT DOCUMENTS

CN 105095720 11/2015
GB 2 490 593 11/2012
(Continued)

OTHER PUBLICATIONS

Extended Search Report dated Jan. 3, 2018 in counterpart European Patent Application No. 17183868.3.
(Continued)

*Primary Examiner* — John B Strege
(74) *Attorney, Agent, or Firm* — Nixon & Vanderhye P.C.

(57) ABSTRACT

An electronic device is provided, and may comprise a housing, a touch screen module, and a processor. The housing may include a first surface facing a first direction, a second surface facing a second direction opposite the first direction, and a side member including a side surface surrounding at least a part of a space between the first surface and the second surface. The touch screen module may be exposed through at least a part of the first surface. The processor may be located in the housing and electrically coupled to the touch screen module.

In the electronic device, at least a part of the first surface may be a display area, and at least a part of the display area may be a fingerprint sensing area.

In the electronic device, the touch screen module may include a window configured to form the display area, a display panel located under the display area in the space and configured to output an image through the display area, a touch sensor disposed under the display area in the space and configured to output a signal in response to contact of an conductive object on the display area, and a fingerprint
(Continued)

sensor disposed under the fingerprint sensing area in the space and configured to output a signal in response to contact of a fingerprint on the fingerprint sensing area.

15 Claims, 32 Drawing Sheets

(56) References Cited

U.S. PATENT DOCUMENTS

| | | |
|---|---|---|
| 2014/0333328 A1 | 11/2014 | Nelson et al. |
| 2015/0036065 A1 | 2/2015 | Yousefpor et al. |
| 2015/0169163 A1 | 6/2015 | Lee et al. |
| 2015/0371076 A1 | 12/2015 | Lee et al. |
| 2016/0004899 A1 | 1/2016 | Pi et al. |
| 2016/0063306 A1 | 3/2016 | North et al. |
| 2016/0098140 A1 | 4/2016 | Lee et al. |
| 2016/0188032 A1 | 6/2016 | Lin |
| 2017/0213019 A1 | 7/2017 | Mao |
| 2017/0220844 A1* | 8/2017 | Jones .................. G06K 9/0053 |
| 2017/0228072 A1 | 8/2017 | Amin et al. |
| 2018/0032778 A1* | 2/2018 | Lang ................... G06K 9/0002 |

FOREIGN PATENT DOCUMENTS

| | | |
|---|---|---|
| JP | 2006-134086 | 5/2006 |
| WO | 2016/061155 | 4/2016 |
| WO | 2016/093669 | 6/2016 |

OTHER PUBLICATIONS

Search Report dated Nov. 8, 2017 in counterpart International Patent Application No. PCT/KR2017/008065.

* cited by examiner

ELECTRONIC DEVICE HAVING FINGERPRINT SENSOR

CROSS-REFERENCE TO RELATED APPLICATION

This application is based on and claims priority under 35 U.S.C. § 119 to a Korean patent application filed on Aug. 3, 2016 in the Korean Intellectual Property Office and assigned Serial number 10-2016-0098796, the disclosure of which is incorporated by reference herein in its entirety.

TECHNICAL FIELD

The present disclosure relates generally to an electronic device having a fingerprint sensor.

BACKGROUND

Recent electronic devices (e.g., smart phones) may have a touch screen as input/output means for providing intuitive usability to the user. In addition, the electronic device may include a fingerprint sensor as user authentication means for protecting personal information, Internet banking, and payment.

The front surface of the electronic device, normally used for displaying data, may be divided into an area for sensing a touch and an area for sensing a fingerprint. Namely, a fingerprint sensing area may be distinguished from a display area. For example, the fingerprint sensor may be located below a button (e.g., a home button) exposed through the front surface of the electronic device, and may create a signal in response to a finger's touch on the button.

Meanwhile, there may be a user's demand for an increase of the display area. Such a demand may be solved by implementing the electronic device to detect fingerprints as well as touches from the display area without separately constructing the fingerprint sensing area on the front surface.

SUMMARY

Various embodiments of the present disclosure provide an electronic device capable of sensing a touch and a fingerprint in a display area.

According to various example embodiments of the present disclosure, an electronic device may comprise a housing, a touch screen module comprising a touch screen, and a processor. The housing may include a first surface facing a first direction, a second surface facing a second direction opposite the first direction, and a side surface surrounding at least a part of a space between the first surface and the second surface. The touch screen may be exposed through at least a part of the first surface. The processor may be located in the housing and electrically coupled to the touch screen module.

In the electronic device, at least a part of the first surface may be a display area, and at least a part of the display area may be a fingerprint sensing area.

In the electronic device, the touch screen module may include a window configured to form the display area, a display panel located under the display area in the space to output an image through the display area, a touch sensor disposed under the display area in the space to output a signal in response to contact of an conductive object on the display area, and a fingerprint sensor located under the fingerprint sensing area in the space to output a signal in response to contact of a fingerprint on the fingerprint sensing area.

BRIEF DESCRIPTION OF THE DRAWINGS

The above and/or other aspects, features and attendant advantages of the present disclosure will be more apparent and readily appreciated from the following detailed description, taken in conjunction with the accompanying drawings, in which like reference numerals refer to like elements, and wherein.

DETAILED DESCRIPTION

Figure 1:
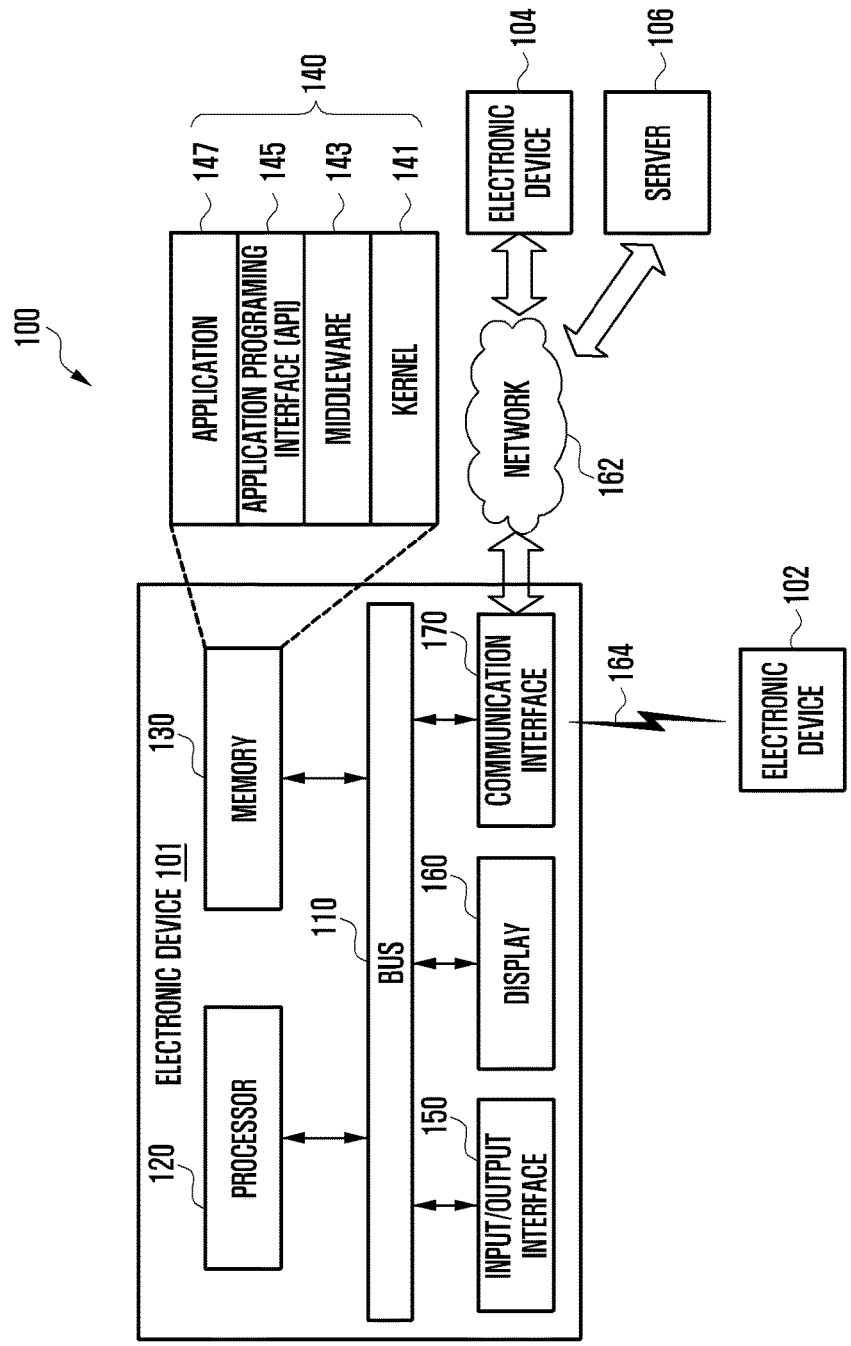
FIG. 1 is a block diagram illustrating an electronic device in a network environment according to various example embodiments of the present disclosure.

The present disclosure will be described with reference to the accompanying drawings. Although various example embodiments are illustrated in the drawings and related detailed descriptions are discussed in the present disclosure, the present disclosure may have various modifications and several embodiments. However, various embodiments of the present disclosure are not limited to a specific implementation form and it should be understood that the present disclosure includes all changes and/or equivalents and substitutes included in the spirit and scope of various embodiments of the present disclosure. In connection with descriptions of the drawings, similar components are designated by the same reference numeral.

The term "include" or "may include" which may be used in describing various embodiments of the present disclosure refers to the existence of a corresponding disclosed function, operation or component which can be used in various embodiments of the present disclosure and does not limit one or more additional functions, operations, or components. In various embodiments of the present disclosure, the terms such as "include" or "have" may be understood to denote a certain characteristic, number, step, operation, constituent element, component or a combination thereof, but may not be understood to exclude the existence of or a possibility of the addition of one or more other characteristics, numbers, steps, operations, constituent elements, components or combinations thereof.

In various embodiments of the present disclosure, the expression "or" or "at least one of A or/and B" includes any or all of combinations of words listed together. For example, the expression "A or B" or "at least A or/and B" may include A, may include B, or may include both A and B.

The expression "1", "2", "first", or "second," etc., used in various embodiments of the present disclosure may modify various components of the various embodiments but does not limit the corresponding components. For example, the above expressions do not limit the sequence and/or importance of the components. The expressions may be used for distinguishing one component from other components. For example, a first user device and a second user device may indicate different user devices although both of them are user devices. For example, without departing from the scope of the present disclosure, a first structural element may be referred to as a second structural element. Similarly, the second structural element also may be referred to as the first structural element.

When it is stated that a component is "coupled to" or "connected to" another component, the component may be directly coupled or connected to another component or a new component may exist between the component and another component. On the other hand, when it is stated that a component is "directly coupled to" or "directly connected to" another component, a new component does not exist between the component and another component.

The terms used in describing various embodiments of the present disclosure are only examples for describing a specific embodiment but do not limit the various embodiments of the present disclosure. Singular forms are intended to include plural forms unless the context clearly indicates otherwise.

Unless defined differently, all terms used herein, which include technical terminologies or scientific terminologies, have the same meaning as that understood by a person skilled in the art to which the present disclosure belongs. Such terms as those defined in a generally used dictionary are to be interpreted to have the meanings equal to the contextual meanings in the relevant field of art, and are not to be interpreted to have ideal or excessively formal meanings unless clearly defined in the present description.

An electronic device according to various example embodiments of the present disclosure may be a device including a communication function. For example, the electronic device may be one or a combination of a smart phone, a tablet Personal Computer (PC), a mobile phone, a video phone, an e-book reader, a desktop PC, a laptop PC, a netbook computer, a Personal Digital Assistant (PDA), a camera, and a wearable device (e.g., a Head-Mounted-Device (HMD) such as electronic glasses; electronic clothes; an electronic bracelet; an electronic necklace; an electronic accessory; an electronic tattoo; and a smart watch), or the like, but is not limited thereto.

According to some example embodiments, the electronic device may be a smart home appliance having a communication function. The smart home appliance may include at least one of a television (TV), a Digital Video Disk (DVD) player, an audio player, an air conditioner, a cleaner, an oven, a microwave oven, a washing machine, an air cleaner, a set-top box, a TV box (e.g., Samsung HomeSync™, Apple TV™, or Google TV™), game consoles, an electronic dictionary, an electronic key, a camcorder, and an electronic frame, or the like, but is not limited thereto.

According to some example embodiments, the electronic device may include at least one of various types of medical devices (e.g., Magnetic Resonance Angiography (MRA), Magnetic Resonance Imaging (MRI), Computed Tomography (CT), a scanner, an ultrasonic device and the like), a navigation device, a global navigation satellite system (GNSS) receiver, an Event Data Recorder (EDR), a Flight Data Recorder (FDR), a vehicle infotainment device, electronic equipment for a ship (e.g., a navigation device for ship, a gyro compass and the like), avionics, a security device, a head unit for a vehicle, an industrial or home robot, an Automatic Teller Machine (ATM) of financial institutions, a Point Of Sale (POS) device of shops, and a device for internet of things (IoT) (e.g., a fire alarm, various sensors, electric or gas meter units, a sprinkler, a thermostat, a streetlamp, a toaster, sport outfits, a hot-water tank, a heater, a boiler and the like), or the like, but is not limited thereto.

According to some example embodiments, the electronic device may include at least one of furniture or a part of a building/structure, an electronic board, an electronic signature receiving device, a projector, and various types of measuring devices (e.g., a water meter, an electricity meter, a gas meter, a radio wave meter and the like) including a camera function, or the like, but is not limited thereto. The electronic device according to various embodiments of the present disclosure may be one or a combination of the above described various devices. Further, the electronic device according to various embodiments of the present disclosure may be a flexible device. It is apparent to those skilled in the art that the electronic device according to various embodiments of the present disclosure is not limited to the above described devices.

Hereinafter, an electronic device according to various example embodiments of the present disclosure will be described with reference to the accompanying drawings. The term "user" used in various embodiments may refer to a person who uses an electronic device or a device (e.g., an artificial intelligence electronic device) which uses an electronic device.

FIG. 1 is a diagram illustrating a network environment 100 including an electronic device 101 according to various example embodiments of the present disclosure. Referring to FIG. 1, the electronic device 101 may include various components including a bus 110, a processor (e.g., including processing circuitry) 120, a memory 130, an input/output interface (e.g., including input/output interface circuitry) 150, a display 160, and a communication interface (e.g., including communication circuitry) 170.

The bus 110 may be a circuit connecting the above described components and transmitting communication (e.g., a control message) between the above described components.

The processor 120 may include various processing circuitry and receive commands from other components (e.g., the memory 130, the input/output interface 150, the display 160, or the communication interface 170) through the bus 110, analyze the received commands, and execute calculation or data processing according to the analyzed commands.

The memory 130 stores commands or data received from the processor 120 or other components (e.g., the input/output interface 150, the display 160, or the communication interface 170) or generated by the processor 120 or other components. The memory 130 may store a software and/or a program 140. For example, the program 140 may include a kernel 141, middleware 143, an Application Programming Interface (API) 145, and an application program (or an application) 147. At least part of the kernel 141, the middleware 143 or the API 145 may refer to an operating system (OS).

The kernel 141 controls or manages system resources (e.g., the bus 110, the processor 120, or the memory 130) used for executing an operation or function implemented by the remaining other programming modules, for example, the middleware 143, the API 145, or the application 147. Further, the kernel 141 provides an interface for accessing individual components of the electronic device 101 from the middleware 143, the API 145, or the application 147 to control or manage the components.

The middleware 143 performs a relay function of allowing the API 145 or the application 147 to communicate with the kernel 141 to exchange data. Further, in operation requests received from the application 147, the middleware 143 performs a control for the operation requests (e.g., scheduling or load balancing) by using a method of assigning a priority, by which system resources (e.g., the bus 110, the processor 120, the memory 130 and the like) of the electronic device 101 can be used, to the application 147.

The API 145 is an interface by which the application 147 can control a function provided by the kernel 141 or the middleware 143 and includes, for example, at least one interface or function (e.g., command) for a file control, a window control, image processing, or a character control.

According to various embodiments, the application 147 may include a Short Message Service (SMS)/Multimedia Messaging Service (MMS) application, an email application, a calendar application, an alarm application, a health care application (e.g., application measuring quantity of exercise or blood sugar) or an environment information application (e.g., application providing information on barometric pressure, humidity or temperature). Additionally, or alternatively, the application 147 may be an application related to an information exchange between the electronic device 101 and an external electronic device (e.g., electronic device 104). The application 147 related to the information exchange may include, for example, a notification relay application for transferring particular information to the external electronic device or a device management application for managing the external electronic device.

For example, the notification relay application may include a function of transmitting notification information generated by another application (e.g., an SMS/MMS application, an email application, a health care application or an environment information application) of the electronic device 101 to the external electronic device (e.g., electronic device 104). Additionally, or alternatively, the notification relay application may receive notification information from, for example, the external electronic device 104, and provide the received notification information to the user. The device management application may manage (e.g., install, remove, or update) at least a part of functions of the electronic device. For example, the device management application may turn on/off the external electronic device (or some components of the external electronic device), control a brightness of the display of the external electronic device or communicate with the electronic device 101, an application executed in the external electronic device 104, or a service (e.g., call service or message service) provided by the external electronic device 104.

According to various embodiments, the application 147 may include an application designated according to an attribute (e.g., type of electronic device) of the external electronic device 104. For example, when the external electronic device 104 is an MP3 player, the application 147 may include an application related to music reproduction. Similarly, when the external electronic device 104 is a mobile medical device, the application 147 may include an application related to health care. According to an embodiment, the application 147 may include at least one of an application designated to the electronic device 101 and an application received from an external electronic device (e.g., server 106 or electronic device 104).

The input/output interface 150 may include various input/output circuitry and may transmit a command or data input from the user through an input/output device (e.g., a sensor, a keyboard, or a touch screen) to the processor 120, the memory 130, the communication interface 170, or the display 160 through, for example, the bus 110. For example, the input/output interface 150 may provide data on a user's touch input through a touch screen to the processor 120. Further, the input/output interface 150 may output a command or data received, through, for example, the bus 110, from the processor 120, the memory 130, or the communication interface 170 through the input/output device (e.g., a speaker or a display). For example, the input/output interface 150 may output voice data processed through the processor 120 to the user through the speaker.

The display 160 may include, for example, liquid crystal display (LCD), flexible display, transparent display, light-emitting diode (LED) display, organic light-emitting diode (OLED) display, microelectromechanical systems (MEMS) display, or electronic paper display, or the like, but is not limited thereto. The display 160 may visually offer, for example, various contents (e.g., text, image, video, icon, symbol, etc.) to users. The display 160 may include a touch screen and receive, for example, a touch, gesture, proximity, or hovering input using an electronic pen or a user's body. According to an embodiment, the display 160 may be one or more displays. For example, the display 160 may be included in the electronic device 101 or included in an external device (e.g., the electronic device 102 or 104) having a wired or wireless connection with the electronic device 101, thus outputting information offered by the electronic device 101 to users.

According to an embodiment, the display 160 may be attachable to or detachable from the electronic device 101. For example, the display 160 may include an interface which can be mechanically or physically connected with the electronic device 101. According to an embodiment, in case the display 160 is detached (e.g., separated) from the electronic device 101 by a user's selection, the display 160 may receive various control signals or image data from the processor 120, e.g., through wireless communication.

The communication interface 170 may include various communication circuitry and establish communication between the electronic device 101 and any external device (e.g., the first external electronic device 102, the second external electronic device 104, or the server 106). For example, the communication interface 170 may be connected with a network 162 through wired or wireless communication and thereby communicate with any external device (e.g., the first external electronic device 102, the second external electronic device 104, or the server 106). The communication interface 170 may be connected with an electronic device 102 via a short-range wireless communication connection 164.

According to an embodiment, the electronic device 101 may be connected with the first external electronic device 102 and the second external electronic device 104 without using the communication interface 170. For example, based on at least one of a magnetic sensor, a contact sensor, a light sensor, and the like that is equipped in the electronic device 101, the electronic device 101 may sense whether at least one of the first and second external electronic devices 102 and 104 is contacted with at least part of the electronic device 101, or whether at least one of the first and second external electronic device 102 and 104, respectively, is attached to at least part of the electronic device 101.

Wireless communication may use, as cellular communication protocol, at least one of LTE (long-term evolution), LTE-A (LTE Advance), CDMA (code division multiple access), WCDMA (wideband CDMA), UMTS (universal mobile telecommunications system), WiBro (Wireless Broadband), GSM (Global System for Mobile Communications), and the like, for example. A short-range communication 163 may include, for example, at least one of Wi-Fi, Bluetooth, Near Field Communication (NFC), Magnetic Secure Transmission or near field Magnetic data Stripe Transmission (MST), and Global Navigation Satellite System (GNSS), and the like. The GNSS may include at least one of, for example, a Global Positioning System (GPS), a Global navigation satellite system (Glonass), a Beidou Navigation Satellite System (hereinafter, referred to as "Beidou"), and Galileo (European global satellite-based navigation system). Hereinafter, the "GPS" may be interchangeably used with the "GNSS" in the present disclosure. Wired communication may include, for example, at least one of USB (universal serial bus), HDMI (high definition multimedia interface), RS-232 (recommended standard-232), POTS (plain old telephone service), and the like. The network 162 may include telecommunication network, for example, at least one of a computer network (e.g., LAN or WAN), internet, and a telephone network.

The first and second external electronic devices 102 and 104 may be identical to, or different from, the electronic device 101. According to an embodiment, the first and second external electronic devices 102 and 104 may include, for example, a plurality of electronic devices. According to an embodiment, the server 106 may include a single server or a group of servers. According to various embodiments, all or part of operations executed in the electronic device 101 may be executed in other electronic device(s), such as the first and second electronic devices 102 and 104 or the server 106.

According to an embodiment, in case the electronic device 101 is required to perform a certain function or service automatically or by request, the electronic device 101 may request another device (e.g., the electronic device 102 or 104 or the server 106) to execute instead, or additionally at least part, of at least one or more functions associated with the required function or service. The requested device may execute the requested function and deliver the result of execution to the electronic device 101. Then, the electronic device 101 may offer the required function or service, based on the received result or by processing the received result. For the above, cloud computing technology, distributed computing technology, or client-server computing technology may be used, for example.

Figure 2:
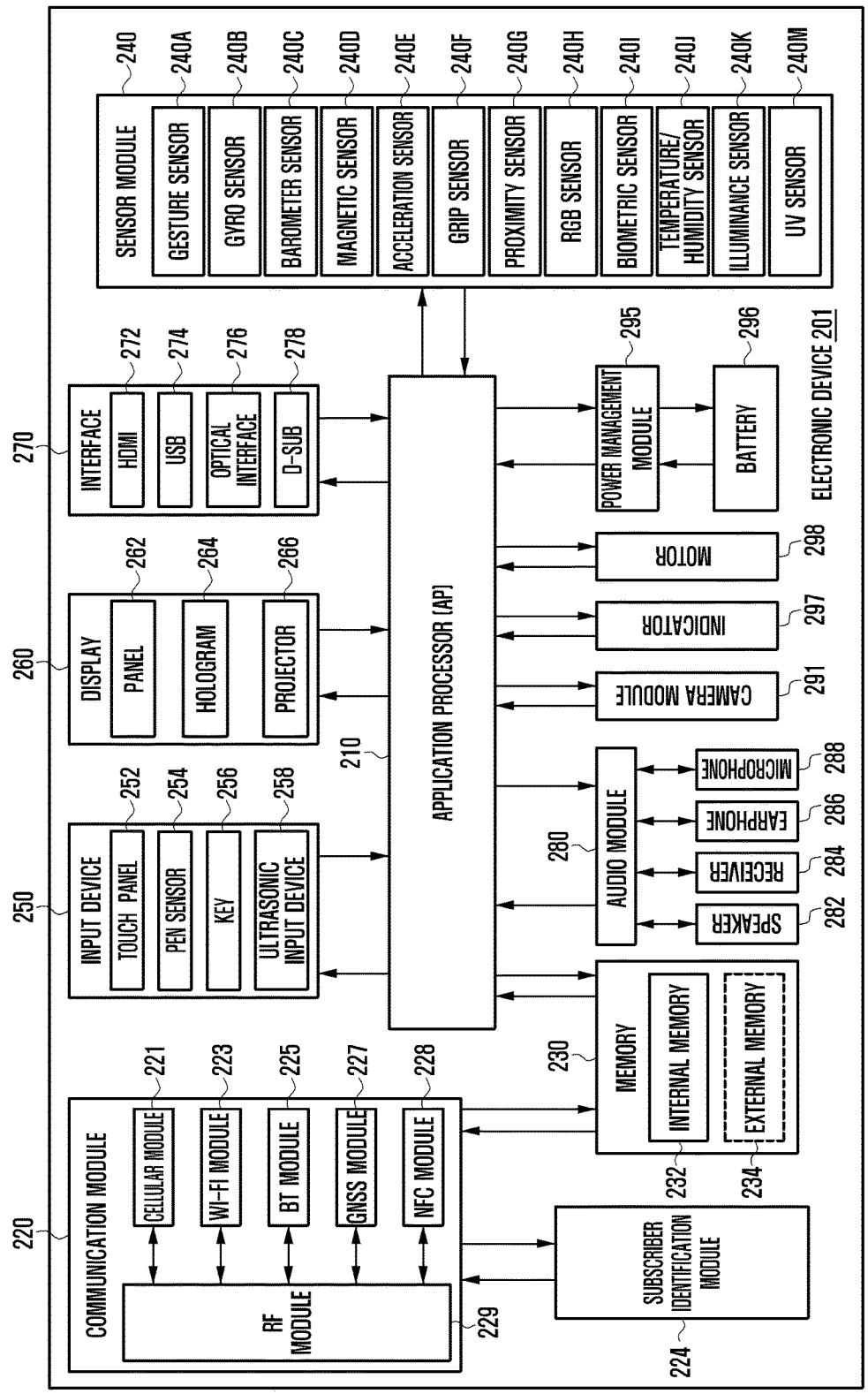
FIG. 2 is a block diagram illustrating an example electronic device according to various example embodiments of the present disclosure.

FIG. 2 is a block diagram illustrating an example configuration of an electronic device 201 according to various example embodiments. For example, the electronic device 201 is capable of including part or all of the components in the electronic device 101 shown in FIG. 1. The electronic device 201 may include one or more processors (e.g., including processing circuitry) 210 (e.g., Application Processors (APs)), a communication module (e.g., including communication circuitry) 220, a Subscriber Identification Module (SIM) 224, a memory 230, a sensor module 240, an input device (e.g., including input circuitry) 250, a display 260, an interface (e.g., including interface circuitry) 270, an audio module 280, a camera module 291, a power management module 295, a battery 296, an indicator 297, and a motor 298.

The processor 210 may include various processing circuitry, such as, for example, and without limitation, a dedicated processor, a CPU, an application processor, a communication processor, and application-specific integrated circuit (ASIC), field-programmable gate array (FGPA), or the like, and is capable of driving, for example, an operating system or an application program to control a plurality of hardware or software components connected to the processor 210, processing various data, and performing operations. The processor 210 may be implemented as, for example, a System on Chip (SoC). According to an embodiment, the processor 210 may further include a graphic processing unit (GPU) and/or an image signal processor. The processor 210 may also include at least part of the components shown in FIG. 2, e.g., a cellular module 221. The processor 210 is capable of loading commands or data received from at least one of other components (e.g., a non-volatile memory) on a volatile memory, processing the loaded commands or data. The processor 210 is capable of storing various data in a non-volatile memory.

The communication module 220 may include the same or similar configurations as the communication interface 170 shown in FIG. 1. For example, the communication module 220 may include various communication circuitry, such as, for example, and without limitation, a cellular module 221, WiFi module 223, Bluetooth (BT) module 225, GNSS module 227 (e.g., a GPS module, Glonass module, Beidou module or Galileo module), NFC module 228, and Radio Frequency (RF) module 229.

The cellular module 221 is capable of providing a voice call, a video call, an SMS service, an Internet service, etc., through a communication network, for example. According to an embodiment, the cellular module 221 is capable of identifying and authenticating an electronic device 201 in a communication network by using a subscriber identification module (SIM) 224 (e.g., a SIM card). According to an embodiment, the cellular module 221 is capable of performing at least part of the functions provided by the processor 210. According to an embodiment, the cellular module 221 is also capable of including a communication processor (CP).

Each of the WiFi module 223, the BT module 225, the GNSS module 227, and the NFC module 228 is capable of including a processor for processing data transmitted or received through the corresponding module. MST module is capable of including a processor for processing data transmitted or received through the corresponding module. According to embodiments, at least part of the cellular module 221, WiFi module 223, BT module 225, GNSS module 227, NFC module 228, and MST module (not shown) (e.g., two or more modules) may be included in one integrated chip (IC) or one IC package.

The RF module 229 is capable of transmission/reception of communication signals, e.g., RF signals. The RF module 229 is capable of including a transceiver, a power amp module (PAM), a frequency filter, a low noise amplifier (LNA), an antenna, etc. According to another embodiment, at least one of the following modules: cellular module 221, WiFi module 223, BT module 225, GNSS module 227, NFC module 228, and MST module (not shown) is capable of transmission/reception of RF signals through a separate RF module.

The SIM module 224 may include a card including a subscriber identification module (SIM) and/or an embodied SIM. The SIM module 224 is also capable of containing unique identification information, e.g., integrated circuit card identifier (ICCID), or subscriber information, e.g., international mobile subscriber identity (IMSI).

The memory 230 (e.g., memory 130 shown in FIG. 1) may include a built-in memory 232 and/or an external memory 234. The built-in memory 232 is capable of including at least one of the following: a volatile memory, e.g., a dynamic RAM (DRAM), a static RAM (SRAM), a synchronous dynamic RAM (SDRAM), etc.; and a non-volatile memory, e.g., a one-time programmable ROM (OTPROM), a programmable ROM (PROM), an erasable and programmable ROM (EPROM), an electrically erasable and programmable ROM (EEPROM), a mask ROM, a flash ROM, a flash memory (e.g., a NAND flash memory, an NOR flash memory, etc.), a hard drive, a solid state drive (SSD), etc.

The external memory 234 is also capable of including a flash drive, e.g., a compact flash (CF), a secure digital (SD), a micro secure digital (Micro-SD), a mini secure digital (Mini-SD), an extreme digital (xD), a multi-media card (MMC), a memory stick, etc. The external memory 234 is capable of being connected to the electronic device 201, functionally and/or physically, through various interfaces.

The memory 230 is capable of storing payment information and a payment application serving as one of the application programs. The payment information may refer to credit card numbers and PINs, corresponding to a credit card. The payment information may also include user authentication information, e.g., fingerprints, facial features, voice information, etc.

When the payment application is executed by the processor 210, it may enable the processor 210 to perform: an interaction with the user to make payment (e.g., displaying a screen to select a card (or a card image) and obtaining information (e.g., a card number) corresponding to a selected card (e.g., a pre-specified card) from payment information); and an operation to control magnetic field communication (e.g., transmitting the card information to an external device (e.g., a card reading apparatus) through the NFC module 228 or MST module (not shown)).

The sensor module 240 is capable of measuring/detecting a physical quantity or an operation state of the electronic device 201, and converting the measured or detected information into an electronic (electrical) signal. The sensor module 240 may include, for example, at least one of the following: a gesture sensor 240A, a gyro sensor 240B, an atmospheric pressure (e.g., barometer) sensor 240C, a magnetic sensor 240D, an acceleration sensor 240E, a grip sensor 240F, a proximity sensor 240G, a color sensor 240H (e.g., a red, green and blue (RGB) sensor), a biometric sensor 240I, a temperature/humidity sensor 240J, an illuminance sensor 240K, and a ultraviolet (UV) sensor 240M. Additionally or alternatively, the sensor module 240 is capable of further including an E-nose sensor, an electromyography (EMG) sensor, an electroencephalogram (EEG) sensor, an electrocardiogram (ECG) sensor, an infrared (IR) sensor, an iris sensor and/or a fingerprint sensor. The sensor module 240 is capable of further including a control circuit for controlling one or more sensors included therein. In embodiments, the electronic device 201 is capable of including a processor, configured as part of the processor 210 or a separate component, for controlling the sensor module 240. In this case, while the processor 210 is operating in sleep mode, the processor is capable of controlling the sensor module 240.

The input device 250 may include various input circuitry, such as, for example, and without limitation, a touch panel 252, a digital pen sensor 254, a key 256, or an ultrasonic input unit 258. The touch panel 252 may use, for example, at least one of a capacitive type, a resistive type, an infrared type, and an ultrasonic type. Also, the touch panel 252 may further include a control circuit. The touch panel 252 may further include a tactile layer to offer a tactile feedback to a user. According to an embodiment, the touch panel 252 may include a pressure sensor (or a force sensor) capable of measuring the strength or pressure of a user's touch. This pressure sensor may be formed integrally with or separately from the touch panel 252.

The digital pen sensor 254 may be a part of the touch panel or include a separate sheet for recognition. The key 256 may include, for example, a physical button, an optical key, or a keypad. The ultrasonic input unit 258 may detect ultrasonic waves occurring at an input tool through a microphone (e.g., 288) and thereby identify data corresponding to the detected ultrasonic waves.

The display 260 may include, for example, a panel 262, a hologram unit 264, or a projector 266. The panel 262 may include the same or similar configurations as the display 160 shown in FIG. 1. The panel 262 may be implemented to be flexible, transparent, or wearable. The panel 262 may also be incorporated into one module together with the touch panel 252. The hologram unit 264 is capable of showing a stereoscopic image in the air by using light interference. The projector 266 is capable of displaying an image by projecting light onto a screen. The screen may be located inside or outside of the electronic device 201. According to an embodiment, the display 260 may further include a control circuit for controlling the panel 262, the hologram unit 264, or the projector 266.

The interface 270 may include various interface circuitry, such as, for example, and without limitation, a high-definition multimedia interface (HDMI) 272, a universal serial bus (USB) 274, an optical interface 276, or a D-subminiature (D-sub) 278. The interface 270 may be included in the communication interface 170 shown in FIG. 1. Additionally or alternatively, the interface 270 is capable of including a mobile high-definition link (MHL) interface, a secure digital (SD) card/multimedia card (MMC) interface, or an infrared data association (IrDA) standard interface.

The audio module 280 is capable of providing bidirectional conversion between a sound and an electronic signal. At least part of the components in the audio module 280 may be included in the input/output interface 150 shown in FIG. 1. The audio module 280 is capable of processing sound information input or output through a speaker 282, a receiver 284, earphones 286, microphone 288, etc.

The camera module 291 refers to a device capable of taking both still and moving images. According to an embodiment, the camera module 291 is capable of including one or more image sensors (e.g., a front image sensor or a rear image sensor), a lens, an image signal processor (ISP), a flash (e.g., an LED or xenon lamp), etc.

The power management module 295 is capable of managing power of the electronic device 201. According to an embodiment, the power management module 295 is capable of including a power management integrated circuit (PMIC), a charger IC, or a battery or fuel gauge. The PMIC may employ wired charging and/or wireless charging methods. Examples of the wireless charging method are magnetic resonance charging, magnetic induction charging, and electromagnetic charging. To this end, the PIMC may further include an additional circuit for wireless charging, such as a coil loop, a resonance circuit, a rectifier, etc. The battery gauge is capable of measuring the residual capacity, charge in voltage, current, or temperature of the battery 296. The battery 296 takes the form of either a rechargeable battery or a solar battery.

The indicator 297 is capable of displaying a specific status of the electronic device 201 or a part thereof (e.g., the processor 210), e.g., a boot-up status, a message status, a charging status, etc. The motor 298 is capable of converting an electrical signal into mechanical vibrations, such as, a vibration effect, a haptic effect, etc. Although not shown, the electronic device 201 is capable of further including a processing unit (e.g., GPU) for supporting a mobile TV. The processing unit for supporting a mobile TV is capable of processing media data pursuant to standards, e.g., digital multimedia broadcasting (DMB), digital video broadcasting (DVB), or mediaFlo™, etc.

Each of the elements described in the present disclosure may be formed with one or more components, and the names of the corresponding elements may vary according to the type of the electronic device. In various embodiments, the electronic device may include at least one of the above described elements described in the present disclosure, and may exclude some of the elements or further include other additional elements. Further, some of the elements of the electronic device according to various embodiments may be coupled to form a single entity while performing the same functions as those of the corresponding elements before the coupling.

Figure 3:
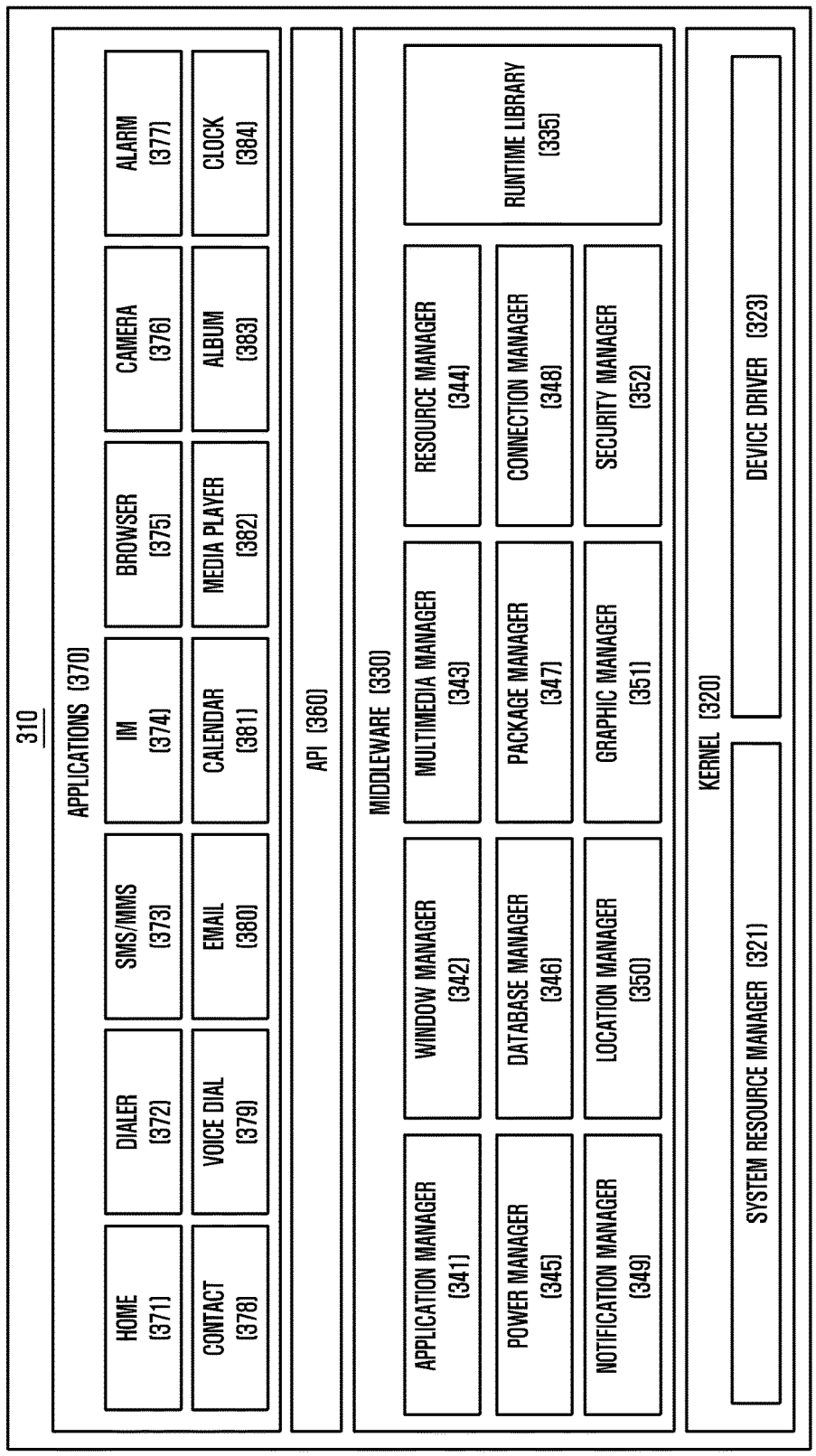
FIG. 3 is a block diagram illustrating an example program module according to various example embodiments of the present disclosure.

FIG. 3 is a block diagram illustrating an example programming module according to various example embodiments. According to an embodiment, the program module 310 (e.g., programs 141-147 illustrated in FIG. 1) is capable of including an operation system (OS) for controlling resources related to the electronic device (e.g., electronic device 11) and/or various applications (e.g., application programs 147 shown in FIG. 1) running on the OS. The OS may be Android, iOS, Windows, Symbian, Tizen, Bada, etc.

The program module 310 may include, for example a kernel 320, middleware 330, application programming interface (API) 360 and/or applications 370. At least part of the program module 310 may be preloaded on the electronic device or downloaded from a server (e.g., an electronic device 102 or 104, server 106, etc.).

The kernel 320 (for example, kernel 141) may include a system resource manager 321 and/or a device driver 323. The system resource manager 321 may include, for example, a process manager, a memory manager, and a file system manager. The system resource manager 321 may perform a system resource control, allocation, and recall. The device driver 323 may include, for example, a display driver, a camera driver, a Bluetooth driver, a shared memory driver, a USB driver, a keypad driver, a WiFi driver, and an audio driver. Further, according to an embodiment, the device driver 312 may include an Inter-Process Communication (IPC) driver.

The middleware 330 may provide a function required in common by the applications 370. Further, the middleware 330 may provide a function through the API 360 to allow the applications 370 to efficiently use limited system resources within the electronic device. According to an embodiment, the middleware 330 (for example, the middleware 143) may include at least one of a runtime library 335, an application manager 341, a window manager 342, a multimedia manager 343, a resource manager 344, a power manager 345, a database manager 346, a package manager 347, a connection manager 348, a notification manager 349, a location manager 350, a graphic manager 351, and a security manager 352.

The runtime library 335 may include, for example, a library module used by a compiler to add a new function through a programming language while the applications 370 are executed. According to an embodiment, the runtime library 335 executes input and output, management of a memory, a function associated with an arithmetic function and the like.

The application manager 341 may manage, for example, a life cycle of at least one of the applications 370. The window manager 342 may manage GUI resources used on the screen. The multimedia manager 343 may detect a format required for reproducing various media files and perform an encoding or a decoding of a media file by using a codec suitable for the corresponding format. The resource manager 344 manages resources such as a source code, a memory, or a storage space of at least one of the applications 370.

The power manager 345 may operate together with a Basic Input/Output System (BIOS) to manage a battery or power and provides power information required for the operation. The database manager 346 may manage generation, search, and change of a database to be used by at least one of the applications 370. The package manager 347 may manage an installation or an update of an application distributed in a form of a package file.

The connection manager 348 may manage, for example, a wireless connection such as WiFi or Bluetooth. The notification manager 349 may display or notify a user of an event such as an arrival message, an appointment, a proximity alarm or the like, in a manner that does not disturb the user. The location manager 350 may manage location information of the electronic device. The graphic manager 351 may manage a graphic effect provided to the user or a user interface related to the graphic effect. The security manager 352 provides a general security function required for a system security or a user authentication. According to an embodiment, when the electronic device (for example, the electronic device 101) has a call function, the middleware 330 may further include a telephony manager for managing a voice of the electronic device or a video call function.

The middleware 330 may, for example, include modules configuring various combinations of functions of the above described components. The middleware 330 is capable of providing modules specialized according to types of operation systems to provide distinct functions. The middleware 330 may be adaptively configured in such a way as to remove part of the existing components or to include new components.

The API 360 (for example, API 145) may be a set of API programming functions, and may be provided with a different configuration according to an operating system. For example, in Android or iOS, a single API set may be provided for each platform. In Tizen, two or more API sets may be provided.

The applications 370 (e.g., application programs 147) may include one or more applications for performing various functions, e.g., home 371, dialer 372, SMS/MMS 373, instant message (IM) 374, browser 375, camera 376, alarm 377, contact 378, voice dial 379, email 380, calendar 381, media player 382, album 383, clock 384. In addition, though not illustrated or shown in the figures, the applications 370 may include, for example, health care (e.g., an application for measuring amount of exercise, blood sugar level, etc.), and environment information (e.g., an application for providing atmospheric pressure, humidity, temperature, etc.).

According to an embodiment, the applications 370 are capable of including an application for supporting information exchange between an electronic device (e.g., electronic device 101) and an external device (e.g., electronic devices 102 and 104), which is hereafter called 'information exchange application'. The information exchange application is capable of including a notification relay application for relaying specific information to external devices or a device management application for managing external devices.

For example, the notification relay application is capable of including a function for relaying notification information, created in other applications of the electronic device (e.g., SMS/MMS application, email application, health care application, environment information application, etc.) to external devices (e.g., electronic devices 102 and 104). In addition, the notification relay application is capable of receiving notification information from external devices to provide the received information to the user.

The device management application is capable of managing (e.g., installing, removing or updating) at least one function of an external device (e.g., electronic devices 102 and 104) communicating with the electronic device. Examples of the function are a function of turning-on/off the external device or part of the external device, a function of controlling the brightness (or resolution) of the display, applications running on the external device, services provided by the external device, etc. Examples of the services are a call service, messaging service, etc.

According to an embodiment, the applications 370 are capable of including an application (e.g., a health care application of a mobile medical device, etc.) specified attributes of an external device (e.g., electronic devices 102 and 104). According to an embodiment, the applications 370 are capable of including applications received from an external device (e.g., a server 106, electronic devices 102 and 104). According to an embodiment, the applications 370 are capable of including a preloaded application or third party applications that can be downloaded from a server. It should be understood that the components of the program module 310 may be called different names according to types of operating systems.

According to various embodiments, at least part of the program module 310 can be implemented with software, firmware, hardware, or any combination of two or more of them. At least part of the program module 310 can be implemented (e.g., executed) by a processor (e.g., processor 120). At least part of the programming module 310 may include modules, programs, routines, sets of instructions or processes, etc., in order to perform one or more functions.

Various example embodiments of the present disclosure provide a handheld electronic device capable of transmitting, to a card reading apparatus, card information carried by magnetic field signals, and thus making payment for costs. Various embodiments also provide a handheld electronic device capable of making payment for costs, etc., through communication with a card reading apparatus, although the apparatus is not equipped with an NFC module, without modifying the existing solution, as if a magnetic card is used against the apparatus. Therefore, the present disclosure is capable of leading to activating offline mobile payment.

The term 'module' as used in various example embodiments of the present disclosure may refer, for example, to a unit including one of hardware, software, and firmware or any combination of two or more of them. The 'module' may be interchangeable with the term 'unit,' 'logic,' 'logical block,' 'component,' or 'circuit.' The 'module' may be the smallest unit of an integrated component or a part thereof. The 'module' may be the smallest unit that performs one or more functions or a part thereof. The 'module' may be mechanically or electronically implemented. For example, the 'module' according to various embodiments of the present disclosure may include at least one of the following: a dedicated processor, a CPU, application-specific integrated circuit (ASIC) chips, field-programmable gate arrays (FPGAs), and programmable-logic devices for performing certain operations, which are now known or will be developed in the future.

At least part of the method (e.g., operations) or system (e.g., modules or functions) according to various embodiments can be implemented with instructions as programming modules that are stored in computer-readable storage media. One or more processors (e.g., processor 120) can execute instructions, thereby performing the functions. An example of the computer-readable storage media may be a memory 130. At least part of the programming modules can be implemented (executed) by a processor. At least part of the programming module may include modules, programs, routines, sets of instructions or processes, etc., in order to perform one or more functions.

Examples of computer-readable media include: magnetic media, such as hard disks, floppy disks, and magnetic tape; optical media such as Compact Disc Read Only Memory (CD-ROM) disks and Digital Versatile Disc (DVD); magneto-optical media, such as floptical disks; and hardware devices that are specially configured to store and perform program instructions (e.g., programming modules), such as read-only memory (ROM), random access memory (RAM), flash memory, etc. Examples of program instructions include machine code instructions created by assembly languages, such as a compiler, and code instructions created by a high-level programming language executable in computers using an interpreter, etc. The described hardware devices may be configured to act as one or more software modules in order to perform the operations and methods described above, or vice versa.

Modules or programming modules according to various embodiments may include one or more components, remove part of them described above, or include new components. The operations performed by modules, programming modules, or the other components, according to various embodiments, may be executed in serial, parallel, repetitive or heuristic fashion. Part of the operations can be executed in any other order, skipped, or executed with additional operations.

The various example embodiments described in the present disclosure are merely provided to assist in a comprehensive understanding of the disclosure and the technology thereof and are not suggestive of limitation. Although example embodiments of the disclosure have been described in detail above and will be described in greater detail below, it should be understood that many variations and modifications of the disclosure herein described, which may be apparent to those skilled in the art, will still fall within the spirit and scope of the embodiments of the disclosure as defined in the appended claims.

Figure 4A:
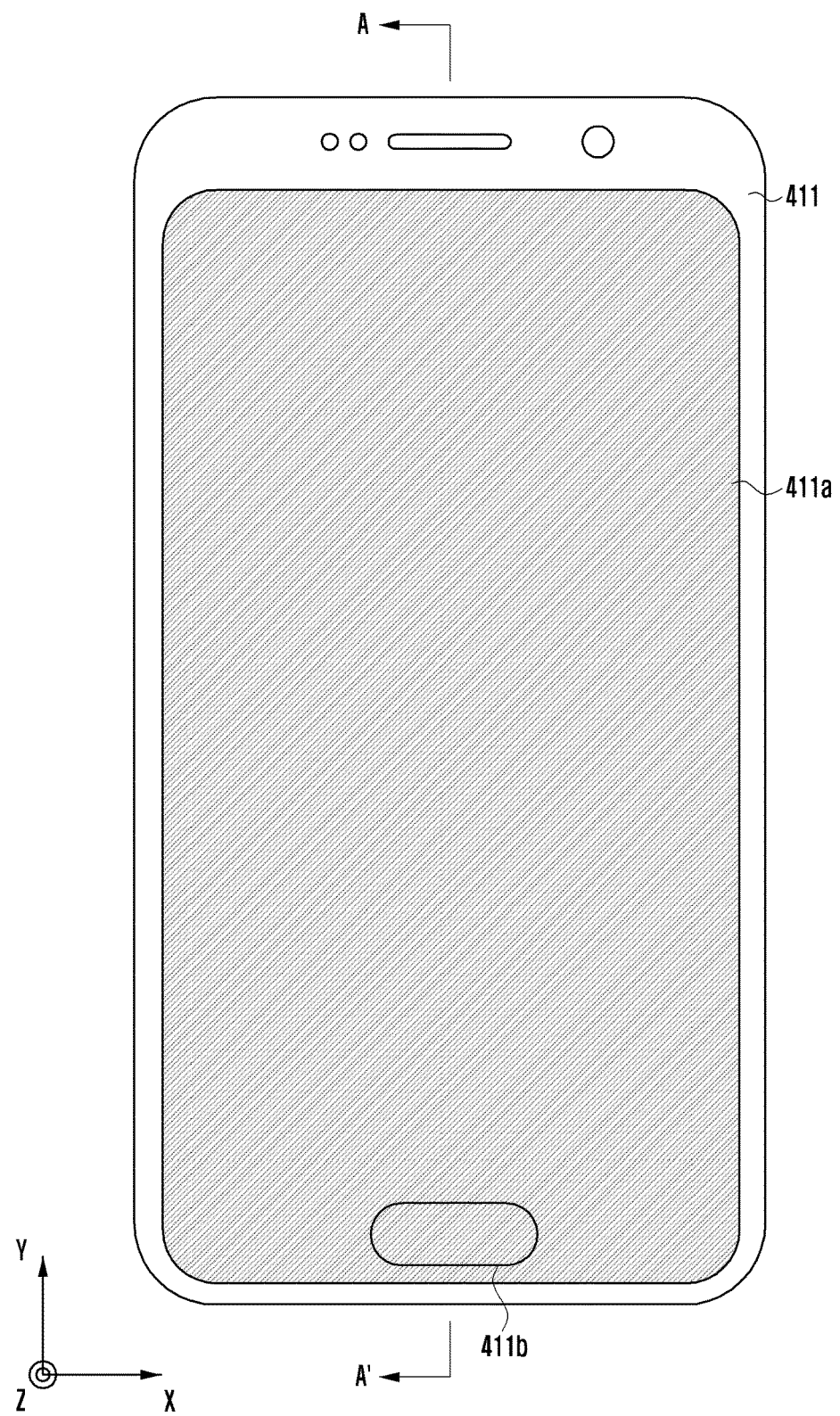
FIGS. 4A, 4B, 4C, 4D and 4E are diagrams illustrating an example electronic device having a fingerprint sensor and a touch sensor formed respectively on different substrates according to various example embodiments of the present disclosure.
Figure 4B:
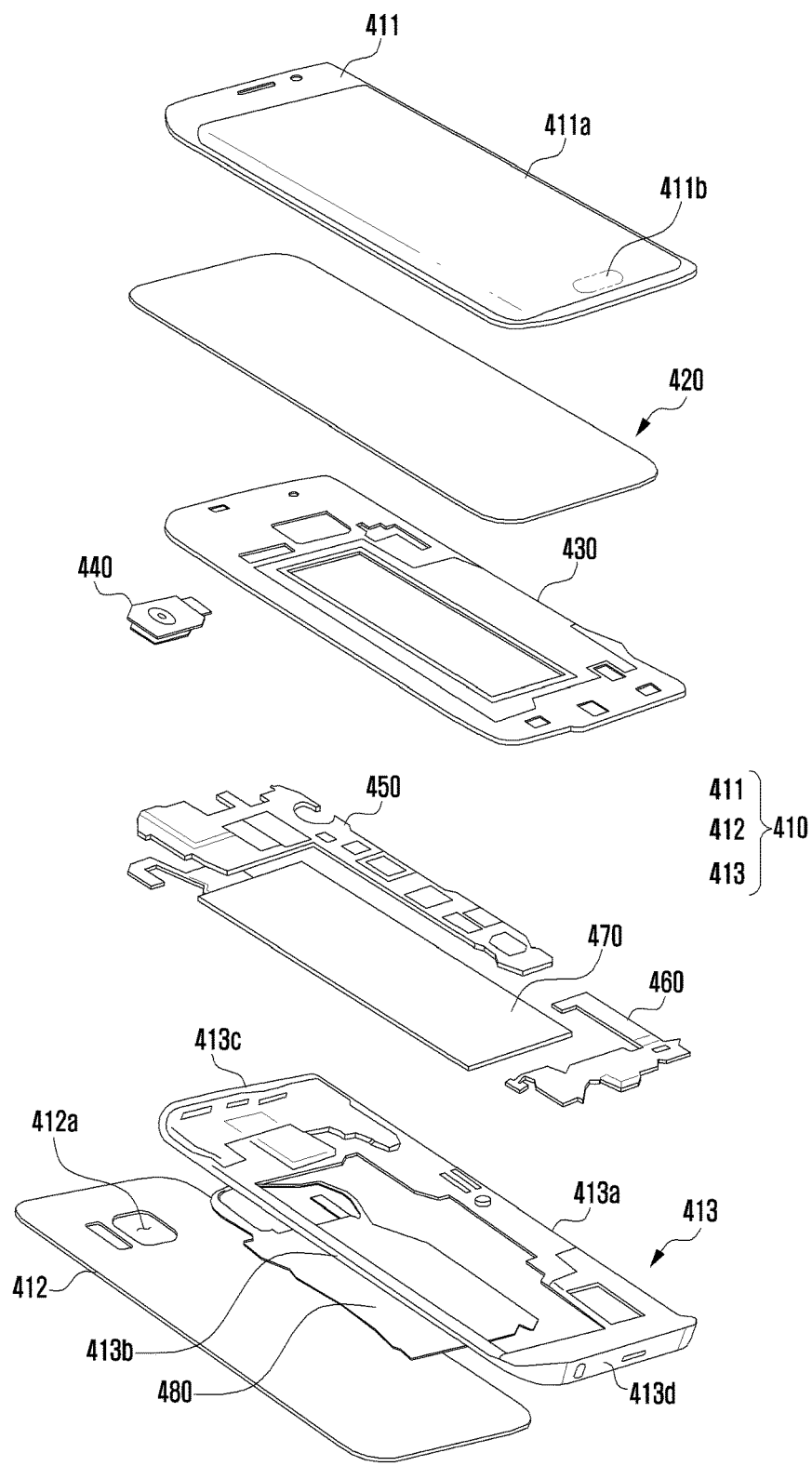
Figure 4C:
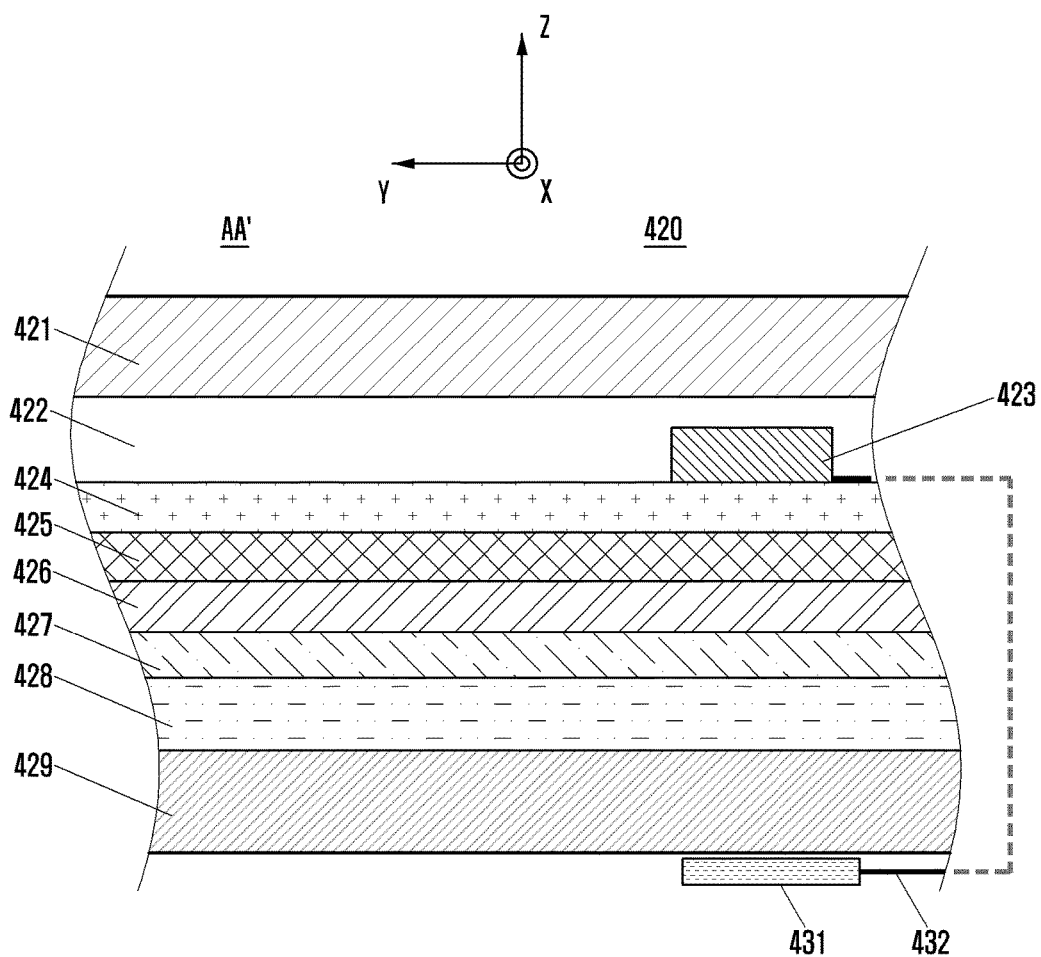
Figure 4D:
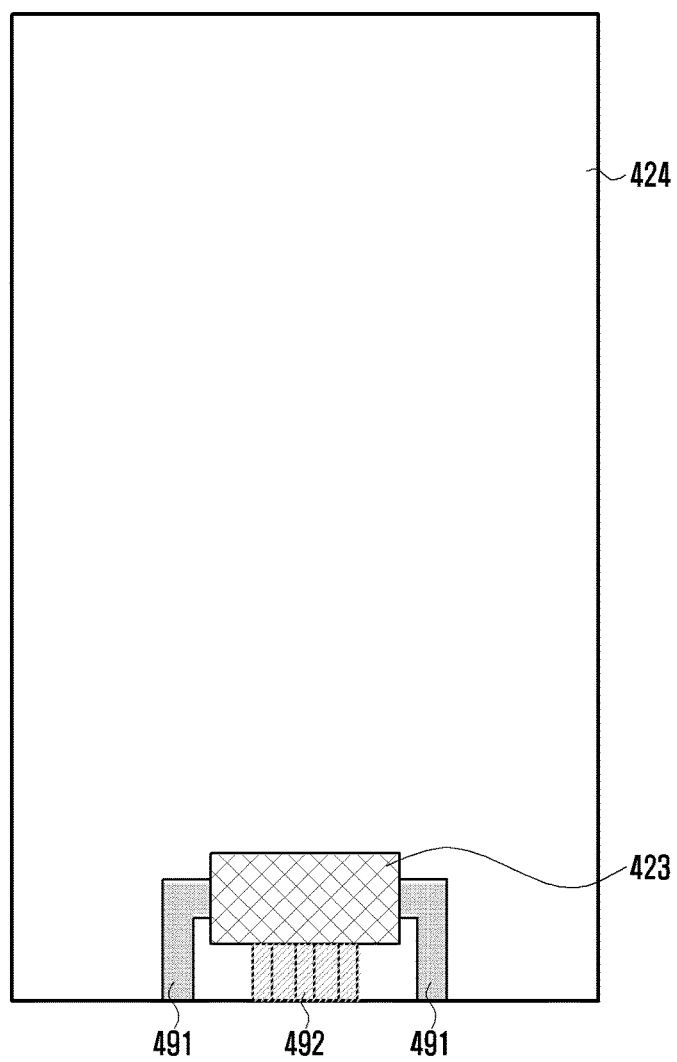
Figure 4E:
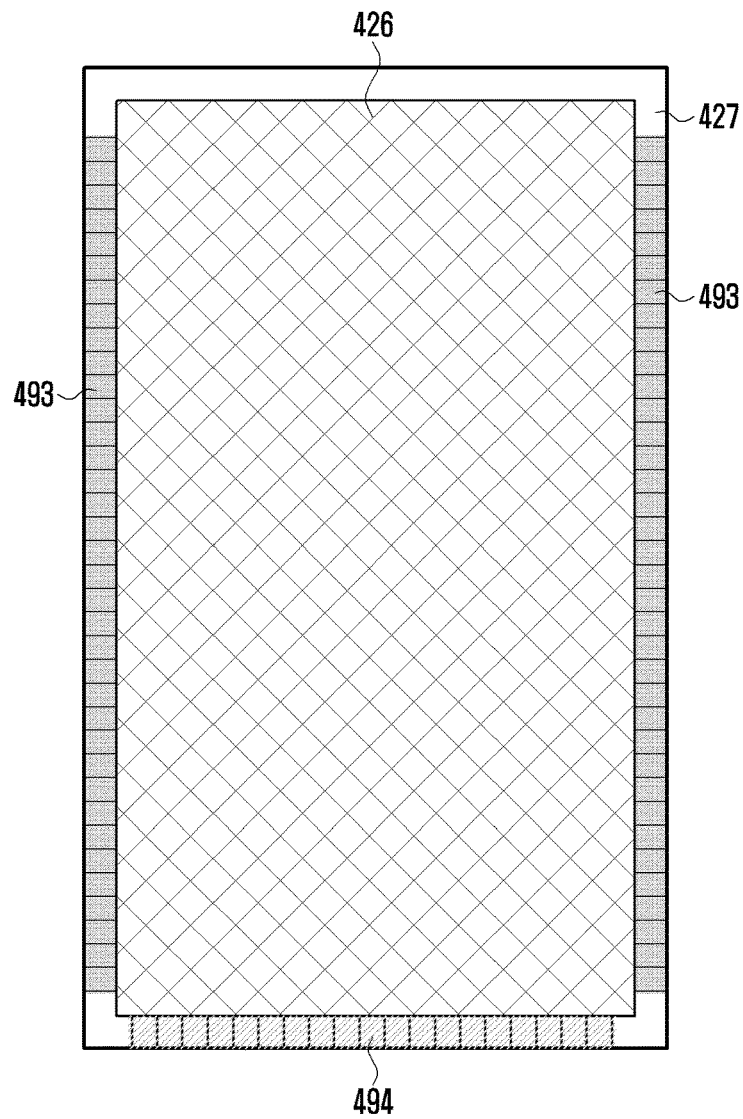

FIGS. 4A, 4B, 4C, 4D and 4E are diagrams illustrating an example electronic device having a fingerprint sensor and a touch sensor formed respectively on different substrates according to various example embodiments of the present disclosure. Specifically, FIG. 4A is a diagram illustrating an example front surface of the electronic device, FIG. 4B is an exploded view of the electronic device, FIG. 4C is a cross-sectional view taken along the line A-A' in FIG. 4A, FIG. 4D is a plan view showing a top surface of a first substrate having a fingerprint sensor formed thereon, and FIG. 4E is a plan view showing a top surface of a second substrate having a touch sensor formed thereon.

Referring to FIGS. 4A and 4B, in an example embodiment, the electronic device (e.g., 101 in FIG. 1 or 201 in FIG. 2) may include various electronic components and a housing 410 for protecting the components. The housing 410 may include a first surface 411 that faces a first direction, a second surface 412 that faces a second direction substantially opposite to the first direction, and a side member 413 including a side surface that surrounds at least a part of a space between the first surface 411 and the second surface 412. For example, the first surface 411 may be a cover that forms a front surface of the electronic device, and a touch screen module 420 may be exposed through a part of the first surface 411. The second surface 412 may be a cover that forms a back surface of the electronic device. The side member 413 may include a right side cover 413a that forms a right side surface of the electronic device, a left side cover 413b that forms a left side surface of the electronic device, an upper side cover 413c that forms an upper side surface of the electronic device, and a lower side cover 413d that forms a lower side surface of the electronic device.

In an example embodiment, disposed in the housing 410 may be the touch screen module 420, a support structure 430 configured to support the first surface 411, a camera 440, a first printed circuit board (PCB) 450, a second PCB 460, a battery 470, and an antenna 480.

The touch screen module 420 is electrically connected to the first PCB 450 and/or the second PCB 460 and displays various kinds of information through a display area 411a of the first surface 411. In response to a touch of an object (e.g., a finger) on the display area 411a, the touch screen module 420 may create and output a signal.

A fingerprint sensing area 411b is a part of the display area 411a as shown, and a fingerprint sensor may be located under the fingerprint sensing area 411b. Therefore, the position of the fingerprint sensing area 411b may vary depending on the position of the fingerprint sensor. In addition, depending on the number of the fingerprint sensors, various parts of the display area 411a may be allocated for the fingerprint sensing area 411b. If a touch sensor located under the display area 411a has the ability to detect a fingerprint, the entire area of the display area 411a may be the fingerprint sensing area 411b. The fingerprint sensor may be included in the touch screen module 420 or separately provided, and may create and output a signal in response to a touch of a fingerprint on the fingerprint sensing area 411b. In order to allow a user to recognize the fingerprint sensing area 411b, the touch screen module 420 may display a particular image (e.g., a button shape) in the fingerprint sensing area 411b or may provide feedback such as vibration when a user input is The camera 440 may be mounted on the first PCB 450 and exposed through a hole 412a formed in the second surface 412. The first PCB 450 may be located near the upper side cover 413c, and the second PCB 460 may be located near the lower side cover 413d. The antenna 480 may include a plurality of coil antennas for payment and may be electrically connected to a communication module (e.g., 220 in FIG. 2) mounted on a PCB (e.g., the first PCB 450 or the second PCB 460).

Referring to FIGS. 4C, 4D and 4E, in an example embodiment, the touch screen module 420 may include a window 421, a first adhesive layer 422, a fingerprint sensor 423, a first substrate 424, a second adhesive layer 425, a touch sensor 426, a second substrate 427, a third adhesive layer 428, and a display panel 429.

Looking from above the first surface 411, the window 421 may be located under the display area 411a and at the top of the above elements of the touch screen module 420.

The window 421 may form the display area 411a and the fingerprint sensing area 411b of the first surface 411.

Namely, the top surface of the window 421, which is exposed at the front surface of the electronic device, may be a region for receiving the touch of an object (e.g., a finger) or the contact of a fingerprint.

The first substrate 424 may be located under the window 421. The fingerprint sensor 423 may be formed on the first substrate 424. For example, the fingerprint sensor 423 may be formed on a part of the top surface (i.e., the surface facing the window 421) of the first substrate 424. Alternatively, although not shown, the fingerprint sensor 423 may be formed on a part of the bottom surface of the first substrate 424. Meanwhile, the fingerprint sensor 423 and the first substrate 424 may be collectively referred to as a fingerprint panel.

The part of the first substrate 424 on which the fingerprint sensor 423 is formed is located under the fingerprint sensing area 411b, and the area of this part may be substantially the same as that of the fingerprint sensing area 411b. The fingerprint sensor 423 may react to a conductive object (e.g., a finger) in an electrostatic manner and may also output a signal in response to the contact of a fingerprint on the fingerprint sensing area 411b. For example, conductive patterns (e.g., wirings) of the fingerprint sensor 423 may be arranged on the first substrate 424 in a matrix form. Patterns arranged in one direction (e.g., horizontally) may be electrically connected to input wirings 491, and patterns arranged in other direction (e.g., vertically) perpendicular to the one direction may be electrically connected to output wirings 492. Intersections between the horizontal pattern and the vertical pattern may be insulated.

A fingerprint sensor controller 431 is electrically connected to the input wirings 491 and the output wirings 492 via a flexible PCB (FPCB) 432 and may output a scan signal to the input wirings 491. When a finger as a conductive object is touched on the fingerprint sensing area 411b, the finger causes a change in the number of electric force lines (e.g., a change in capacitance) between the input wirings 491 and the output wirings 492. Therefore, a signal corresponding to this change may be output to the fingerprint sensor controller 431 through the output wiring 492. The fingerprint sensor controller 431 may process this signal to create fingerprint data and output it to a processor (e.g., 120 in FIG. 1 or 210 in FIG. 2). As shown, the fingerprint sensor controller 431 may be located in a space formed below the display panel 429. For example, the fingerprint sensor controller 431 may be attached as a separate chip or integrated circuit (IC) to the bottom surface of the display panel 429 or mounted on the first PCB 450 or the second PCB 460.

The first substrate 424 may be attached to the bottom surface of the window 421 with an adhesive (e.g., the first adhesive layer 422) such that the fingerprint sensor 423 formed thereon faces the window 421.

The second substrate 427 may be located under the first substrate 424. The touch sensor 426 may be formed on the second substrate 427. For example, the touch sensor 426 may be formed on at least a part of the top surface (i.e., the surface facing the first substrate 424) of the second substrate 427. Alternatively, although not shown, the touch sensor 426 may be formed on at least a part of the bottom surface of the second substrate 427. Meanwhile, the touch sensor 426 and the second substrate 427 may be collectively referred to as a touch panel.

The part of the second substrate 427 on which the touch sensor 426 is formed is located under the display area 411a, and the area of this part may be substantially the same as that of the display area 411a. The touch sensor 426 may react to a conductive object (e.g., a finger) in an electrostatic manner and may also output a signal in response to the contact of the object on the display area 411a. For example, horizontal patterns and vertical patterns of the touch sensor 426 may be arranged in a matrix form on the second substrate 427 and electrically connected to input wirings 493 and output wirings 494, respectively. The input and output wirings 493 and 494 may be electrically connected to a controller (not shown) for controlling the touch sensor 426. The controller for the touch sensor 426 may be mounted on the first substrate 424 or the second substrate 427, for example. The second substrate 427 may be attached to the bottom surface of the first substrate 424 with an adhesive (i.e., the second adhesive layer 425) such that the touch sensor 426 formed thereon faces the first substrate 424.

The display panel 429 is located under the second substrate 427 and may be attached to the bottom surface of the second substrate 427 with an adhesive (i.e., the third adhesive layer 428).

Each of the above-described elements in the touch screen module 420 may have a suitable thickness, as follows. This thickness is an example only and not to be construed as a limitation. For example, the thickness of the window 421 may be 0.5 T (mm), and the thickness of the first adhesive layer 422 (i.e., a gap between the window 421 and the first substrate 424) may be 0.15 T. Also, the thickness of the first substrate 424 may be 0.02 T, and the thickness of the second adhesive layer 425 may be 0.05 T. Also, the thickness of the second substrate 427 may be 0.1 T, and the thickness of the third adhesive layer 428 may be 0.15 T.

The fingerprint sensor 423 and the touch sensor 426 share a sensing region (i.e., the fingerprint sensing area 411b). Therefore, when both are simultaneously activated, the electric force line generated by the fingerprint sensor 423 and the electric force line generated by the touch sensor 426 may interfere with each other, thereby causing an error in sensing a fingerprint or a touch. Thus, the processor (e.g., 120 in FIG. 1 or 210 in FIG. 2) may control each controller to selectively activate the fingerprint sensor 423 and the touch sensor 426.

The touch screen module 420 may be implemented with various transparent materials. For example, the window 421 may be formed of a transparent material such as plastic or glass. The adhesive layers 422, 425 and 428 may be formed of a transparent adhesive material such as optically clear adhesive (OCA) or optically clear resin (OCR). The substrates 424 and 427 may be formed of a transparent insulating material such as poly-ethylene terephthalate (PET), poly ethylene (PE), cyclic olefin copolymer (COC), or glass. In the fingerprint sensor 423 and the touch sensor 426, the patterns that react to the contact of a conductive object may be formed of a transparent conductive material such as indium tin oxide (ITO), graphene, or carbon nano tube (CNT)-AgNW hybrid transparent electrode. Alternatively, the patterns may be formed of a non-transparent conductive material (e.g., metal mesh AgNW). In this case, for the visibility of the display panel 429, the patterns may be formed with a smaller line width enough to be invisible to the naked eye. The above-described materials are examples only and not to be construed as limitations. Such transparent materials may be equally applied to various kinds of touch screen modules which will be described below and may be used in place of the touch screen module 420.

The touch screen module 420 may further include a polarizing plate disposed on the display panel 429. In order to accurately display a black image and also enhance outdoor visibility (e.g., if the display panel 429 is a self-luminous display) or transmit light in a specific direction (e.g., if the display panel 429 is a liquid crystal display), the polarizing plate may be located between the second substrate 427 and the display panel 429, attached to the bottom surface of the second substrate 427 with an adhesive, and attached to the top surface of the display panel 429 with an adhesive. Various touch screen modules to be described below may also include such a polarizing plate.

Figure 5A:
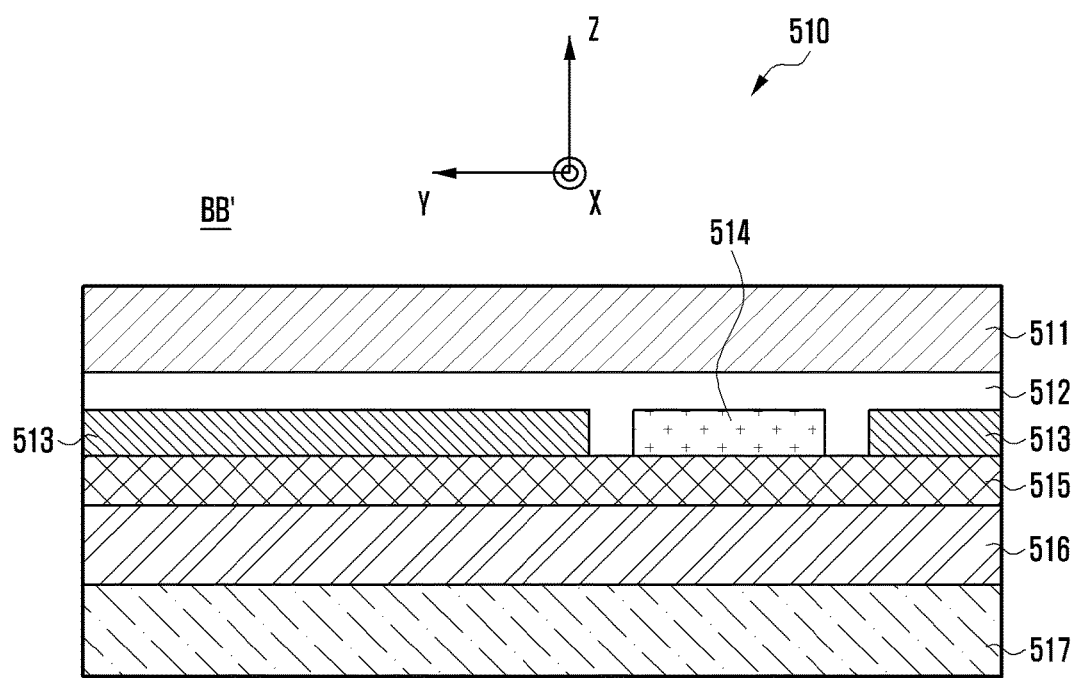
FIG. 5A is a cross section of an example touch screen module having a fingerprint sensor and a touch sensor formed on the same substrate according to various example embodiments of the present disclosure.
Figure 5B:
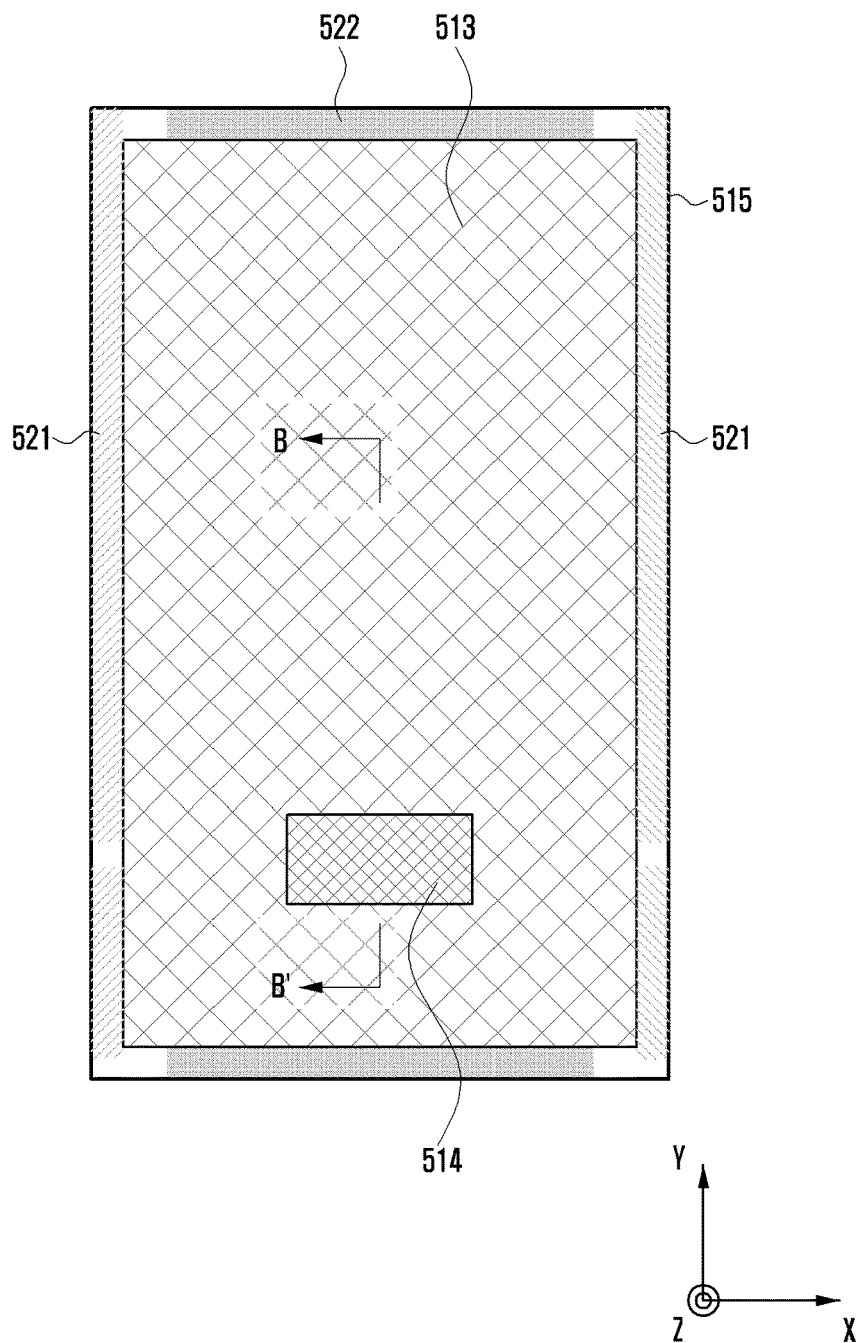
FIG. 5B is a diagram illustrating a top surface of the substrate on which the fingerprint sensor and the touch sensor are formed according to various example embodiments of the present disclosure.

FIG. 5A is a cross section illustrating an example touch screen module having a fingerprint sensor and a touch sensor formed on the same substrate according to various example embodiments of the present disclosure, and FIG. 5B is a diagram illustrating a top surface of the substrate on which the fingerprint sensor and the touch sensor are formed.

Referring to FIGS. 5A and 5B, in an embodiment, a touch screen module 510 may include a window 511, a first adhesive layer 512, a touch sensor 513, a fingerprint sensor 514, a substrate 515, a second adhesive layer 516, and a display panel 517.

The substrate 515 is located under the window 511. The touch sensor 513 may be formed on a part (e.g., a first part) of the top surface (e.g., the surface facing the window 511) of the substrate 515, and the fingerprint sensor 514 may be formed on another part (e.g., a second part) of the top surface of the substrate 515. Alternatively, although not shown, the touch sensor 513 and the fingerprint sensor 514 may be formed on the bottom surface of the substrate 515. The substrate 515 may be referred to as a touch/fingerprint panel. Since the touch sensor 513 and the fingerprint sensor 514 are formed at different parts on the same surface of the substrate 515, the touch sensor 513 and the fingerprint sensor 514 may be simultaneously activated. Here, the second part may correspond to the fingerprint sensing area 411b, and the entire region including the first and second parts may correspond to the display area 411a.

The fingerprint sensor 514 is used for detecting a fingerprint more precisely more than detecting a touch. Therefore, the fingerprint sensor 514 may also be used as a touch sensor that reacts to the contact of a conductive object and outputs a signal in the fingerprint sensing area 411b corresponding to the second part where the touch sensor 513 is not formed.

A pitch between patterns of the touch sensor 513 may be different from a pitch between patterns of the fingerprint sensor 514. Namely, since a fingerprint requires more precise measurement than a touch, the patterns of the fingerprint sensor 514 may be arranged more densely on the substrate 515 than the patterns of the touch sensor 513. The touch sensor 513 may be electrically connected to a controller (not shown) through input wirings 521 and output wirings 522 formed at edges of the substrate 515. The fingerprint sensor 514 may be electrically connected to the input wirings 521 and the output wirings 522 through neighboring patterns of the touch sensor 513 and further electrically connected the controller through the input wirings 521 and the output wirings 522.

The substrate 515 may be attached to the bottom surface of the window 511 with a transparent adhesive (e.g., the first adhesive layer 512) such that the touch sensor 513 and the fingerprint sensor 514 formed thereon face the window 511.

The display panel 517 is located under the substrate 515 and may be attached to the bottom surface of the substrate 515 with a transparent adhesive (i.e., the second adhesive layer 516).

Figure 6A:
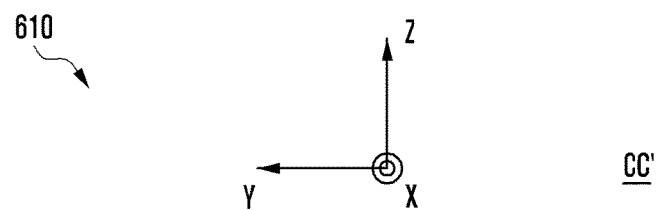
FIG. 6A is a cross section of a touch screen module having a touch sensor capable of detecting a fingerprint according to various example embodiments of the present disclosure.
Figure 6A:
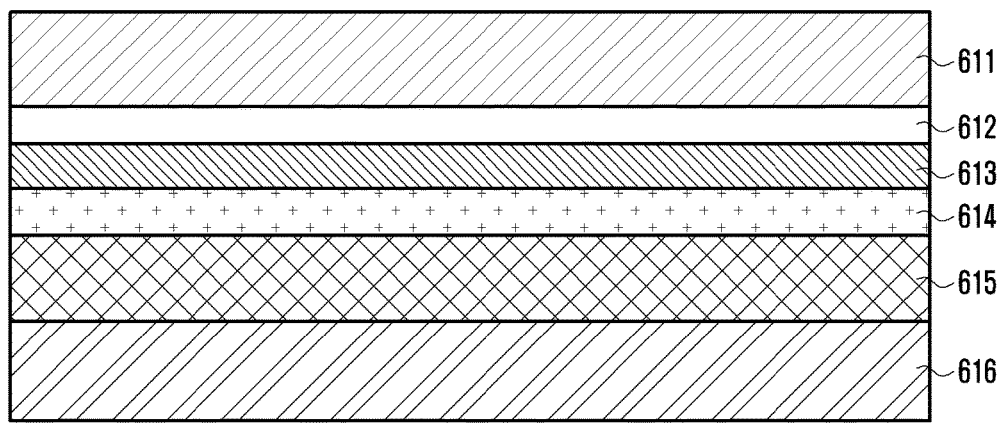
Figure 6B:
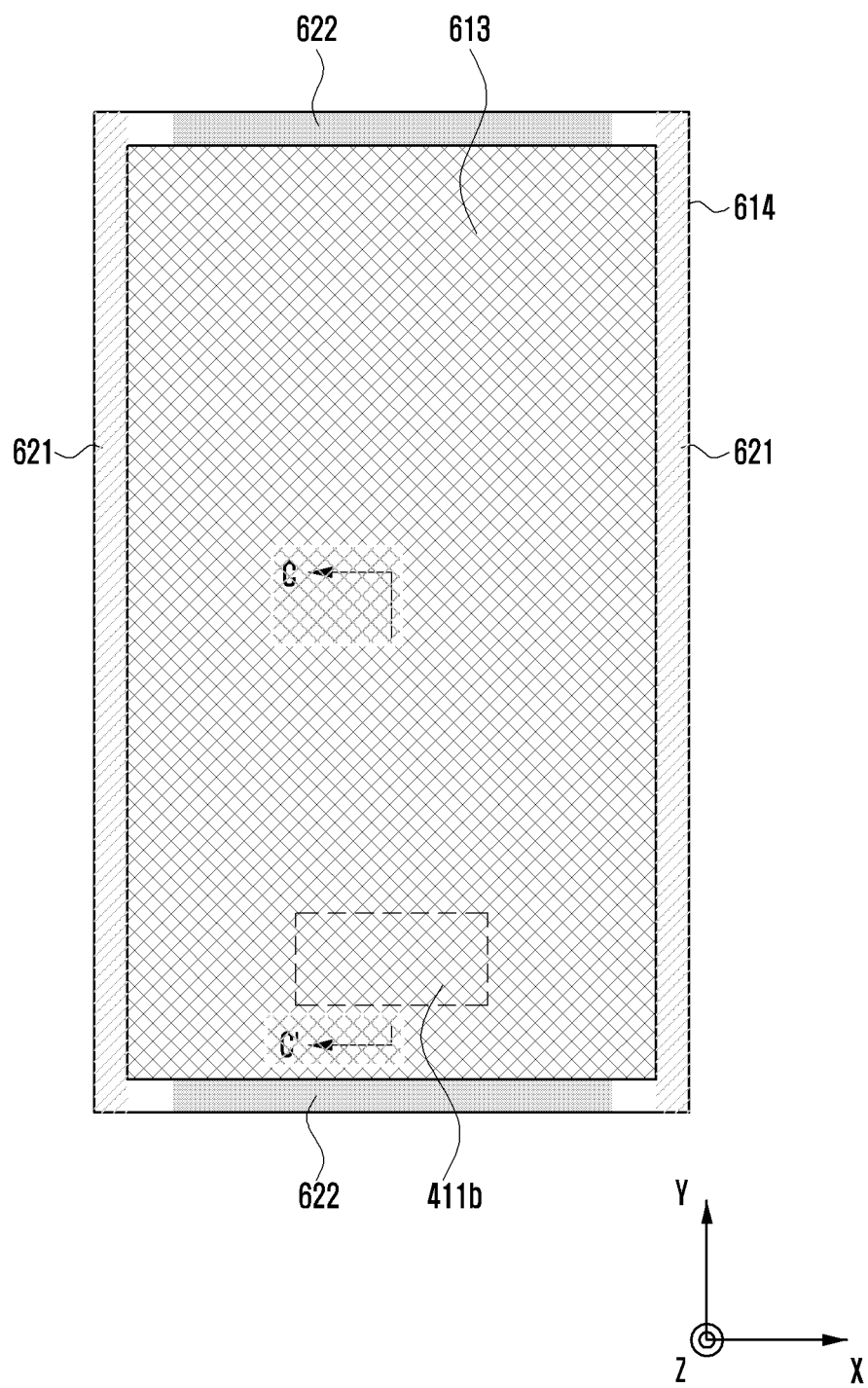
FIG. 6B is a diagram illustrating a top surface of a substrate on which the fingerprint/touch sensor is formed according to various example embodiments of the present disclosure.

FIG. 6A is a cross section illustrating an example touch screen module having a touch sensor capable of detecting a fingerprint according to various example embodiments of the present disclosure, and FIG. 6B is a diagram illustrating a top surface of a substrate on which the fingerprint/touch sensor is formed according to an example embodiment of the present disclosure.

Referring to FIGS. 6A and 6B, in an embodiment, a touch screen module 610 may include a window 611, a first adhesive layer 612, a fingerprint/touch sensor 613, a substrate 614, a second adhesive layer 615, and a display panel 616.

The substrate 614 is located under the window 611, and the fingerprint/touch sensor 613 may be formed on the top surface (alternatively, although not shown, on the bottom surface) of the substrate 614. The fingerprint/touch sensor 613 has patterns with a dense pitch (e.g., being equal to a pitch of patterns in the fingerprint sensor 514 in FIGS. 5A and 5B) and may be used for detecting a fingerprint as well as a touch. When the fingerprint/touch sensor 613 is used for detecting a fingerprint, only some patterns corresponding to the fingerprint sensing area 411b may be activated. In addition, the fingerprint/touch sensor 613 may detect one or more fingerprints at the same time from the entire display area. The fingerprint/touch sensor 613 may be electrically connected to a controller (not shown) through input wirings 621 and output wirings 622 formed at edges of the substrate 614.

The substrate 614 may be attached to the bottom surface of the window 611 with a transparent adhesive (e.g., the first adhesive layer 612) such that the fingerprint/touch sensor 613 formed thereon faces the window 611.

The display panel 616 is located under the substrate 614 and may be attached to the bottom surface of the substrate 614 with a transparent adhesive (e.g., the second adhesive layer 615).

Figure 7:
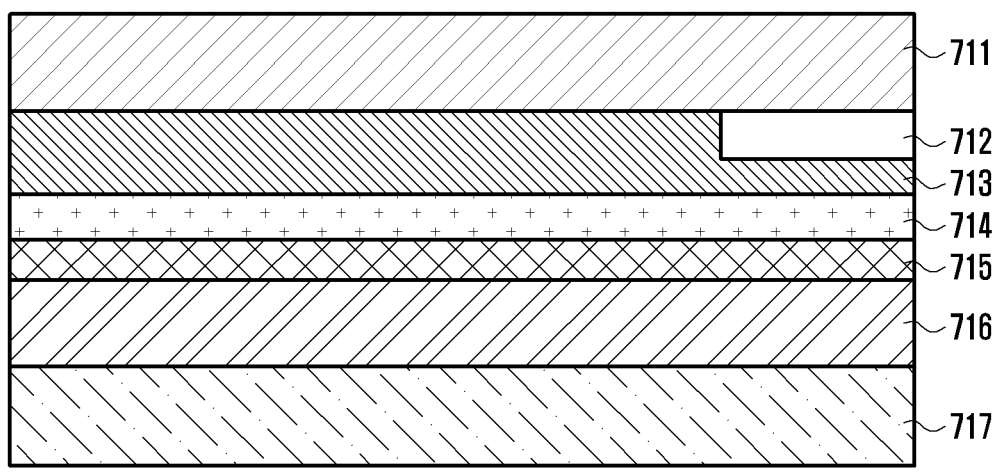
FIG. 7 is a cross section of a touch screen module having a fingerprint sensor formed under a window according to various example embodiments of the present disclosure.

FIG. 7 is a cross section illustrating an example touch screen module having a fingerprint sensor formed under a window according to various example embodiments of the present disclosure.

Referring to FIG. 7, in an example embodiment, a touch screen module 710 may include a window 711, a fingerprint sensor 712, a first adhesive layer 713, a touch sensor 714, a substrate 715, a second adhesive layer 716, and a display panel 717.

The fingerprint sensor 712 may be formed on a part of the bottom surface (e.g., the surface facing the substrate 715) of the window 711. Namely, the window 711 may act as a substrate for forming patterns of the fingerprint sensor 712. The part of the window 711 on which the fingerprint sensor 712 is formed may be a region corresponding to the fingerprint sensing area 4111b.

The substrate 715 is located under the window 711, and the touch sensor 714 may be formed on the top surface (e.g., the surface facing the window 711) of the substrate 715 to correspond to the display area 411a. The substrate 715 may be attached to the bottom surface of the window 711 with a transparent adhesive (e.g., the first adhesive layer 713) such that the touch sensor 714 formed thereon faces the window 711 and is insulated from the fingerprint sensor 712.

The display panel 717 is located under the substrate 715 and may be attached to the bottom surface of the substrate 715 with a transparent adhesive (e.g., the second adhesive layer 716).

Figure 8:
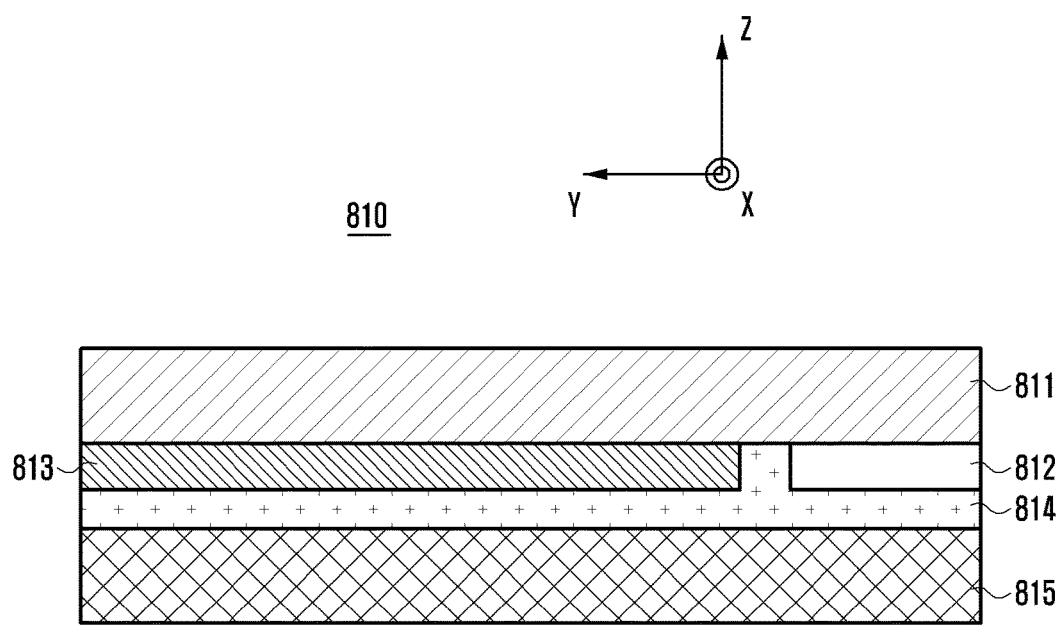
FIG. 8 is a cross section of a touch screen module having a fingerprint sensor and a touch sensor formed under a window according to various example embodiments of the present disclosure.

FIG. 8 is a cross section illustrating an example touch screen module having a fingerprint sensor and a touch sensor formed under a window according to various example embodiments of the present disclosure.

Referring to FIG. 8, in an example embodiment, a touch screen module 810 may include a window 811, a fingerprint sensor 812, a touch sensor 813, an adhesive layer 814, and a display panel 815.

The fingerprint sensor 812 may be formed on a part (e.g., a first part) of the bottom surface (e.g., the surface facing the display panel 815) of the window 811, and the touch sensor 813 may be formed on another part (e.g., a second part) of the bottom surface of the window 811. Here, the first part may correspond to the fingerprint sensing area 411b, and the entire region including the first and second parts may correspond to the display area 411a. The fingerprint sensor 812 may be used for detecting a touch from the fingerprint sensing area 411b.

The display panel 815 is located under the window 811 and may be attached to the bottom surface of the window 811, on which the fingerprint sensor 812 and the touch sensor 813 are formed, with a transparent adhesive (e.g., the adhesive layer 814).

Figure 9:
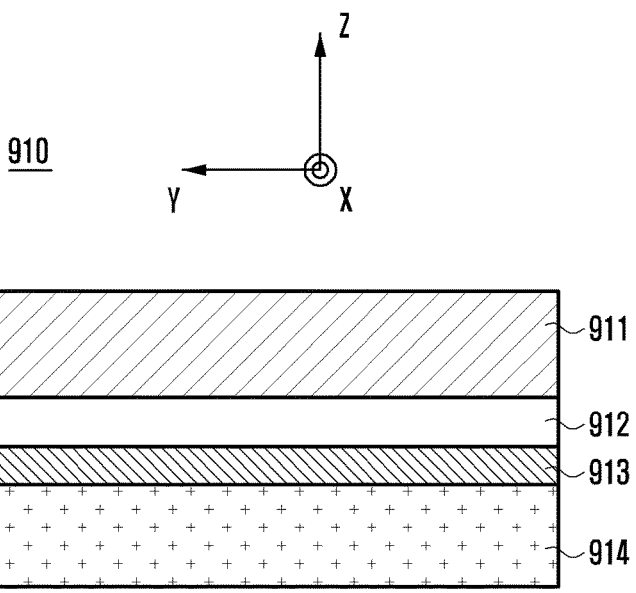
FIG. 9 is a cross section of a touch screen module having a fingerprint/touch sensor formed under a window according to various example embodiments of the present disclosure.

FIG. 9 is a cross section illustrating an example touch screen module having a fingerprint/touch sensor formed under a window according to various example embodiments of the present disclosure.

Referring to FIG. 9, in an example embodiment, a touch screen module 910 may include a window 911, a fingerprint/touch sensor 912, an adhesive layer 913, and a display panel 914.

The fingerprint/touch sensor 912 may be formed on the bottom surface (e.g., the surface facing the display panel 914) of the window 911 to correspond to the display area 411a. The display panel 914 is located under the window 911 and may be attached to the bottom surface of the window 911, on which the fingerprint/touch sensor 912 is formed, with a transparent adhesive (e.g., the adhesive layer 913). The fingerprint/touch sensor 912 may have patterns with the same pitch and may detect a touch and a fingerprint from the entire display area 411a.

Figure 10:
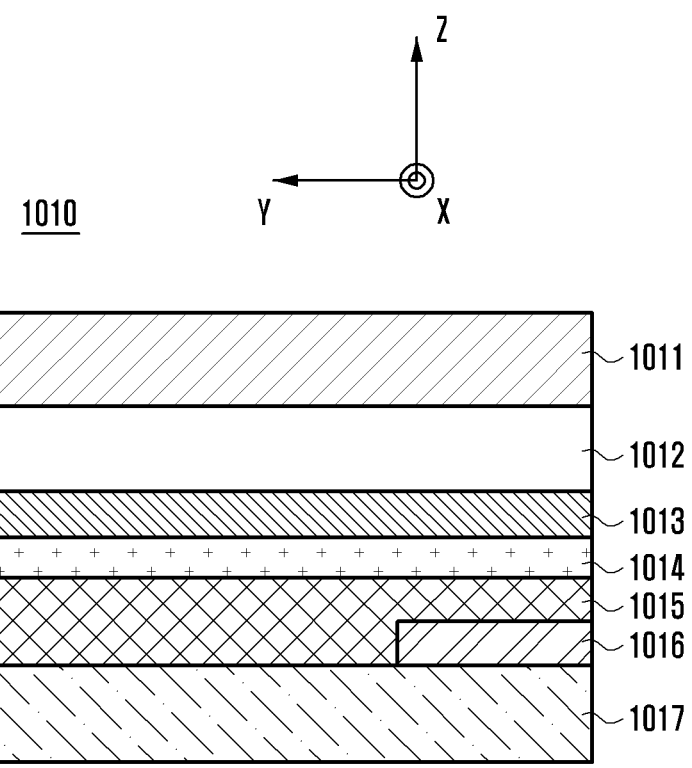
FIG. 10 is a cross section of a touch screen module having a fingerprint sensor formed on a display panel according to various example embodiments of the present disclosure.

FIG. 10 is a cross section illustrating an example touch screen module having a fingerprint sensor formed on a display panel according to various example embodiments of the present disclosure.

Referring to FIG. 10, in an example embodiment, a touch screen module 1010 may include a window 1011, a first adhesive layer 1012, a touch sensor 1013, a substrate 1014, a second adhesive layer 1015, a fingerprint sensor 1016, and a display panel 1017.

The substrate 1014 is located under the window 1011, and the touch sensor 1013 may be formed on the top surface (e.g., the surface facing the window 1011) of the substrate 1014 to correspond to the display area 411a. Alternatively, although not shown, the touch sensor 1013 may be formed on the bottom surface of the substrate 1014. The substrate 1014 may be attached to the bottom surface of the window 1011 with a transparent adhesive (e.g., the first adhesive layer 1012) such that the touch sensor 1013 formed thereon faces the window 1011.

The display panel 1017 is located under the substrate 1014, and the fingerprint sensor 1016 may be formed on a part of the top surface (e.g., the surface facing the substrate 1014) of the display panel 1017. Namely, the display panel 1017 may act as a substrate for forming patterns of the fingerprint sensor 1016. The uppermost layer of the display panel 1017 may be a polarizing plate. The part of the display panel 1017 may be a region corresponding to the fingerprint sensing area 411b. The display panel 1017 may be attached to the bottom surface of the substrate 1014 with a transparent adhesive (e.g., the second adhesive layer 1015) such that the fingerprint sensor 1016 formed thereon faces the substrate 1014.

Figure 11:
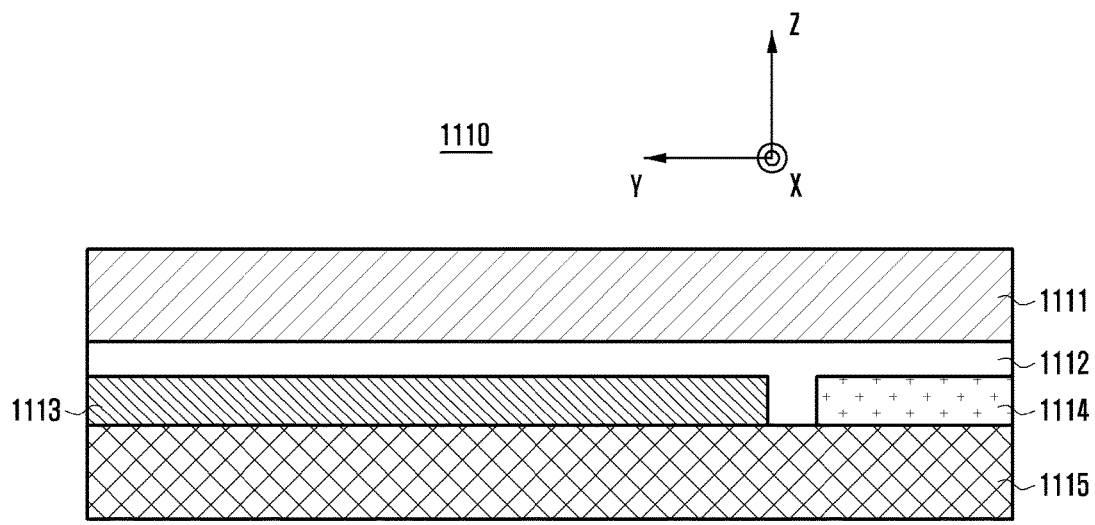
FIG. 11 is a cross section of a touch screen module having a fingerprint sensor and a touch sensor formed on a display panel according to various example embodiments of the present disclosure.

FIG. 11 is a cross section illustrating an example touch screen module having a fingerprint sensor and a touch sensor formed on a display panel according to various example embodiments of the present disclosure.

Referring to FIG. 11, in an example embodiment, a touch screen module 1110 may include a window 1111, an adhesive layer 1112, a touch sensor 1113, a fingerprint sensor 1114, and a display panel 1115.

The display panel 1115 is located under the window 1111. The fingerprint sensor 1114 may be formed on a part (e.g., a first part) of the top surface (e.g., the surface facing the window 1111) of the display panel 1115, and the touch sensor 1113 may be formed on another part (e.g., a second part). Here, the first part may correspond to the fingerprint sensing area 411b, and the entire region including the first and second parts may correspond to the display area 411a. The fingerprint sensor 1114 may be used for detecting a touch from the fingerprint sensing area 411b. The display panel 1115 may be attached to the bottom surface of the window 1111 with an adhesive (e.g., the adhesive layer 1112) such that the fingerprint sensor 1114 and the touch sensor 1113 formed thereon face the window 1111. Patterns of the fingerprint sensor 1114 may have narrower pitches than those of the touch sensor 1113.

Figure 12:
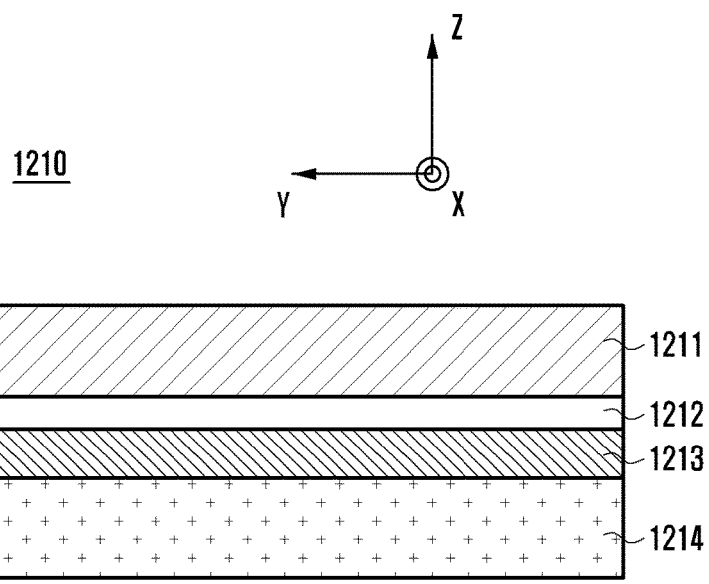
FIG. 12 is a cross section of a touch screen module having a fingerprint/touch sensor formed on a display panel according to various example embodiments of the present disclosure.

FIG. 12 is a cross section illustrating touch screen module having a fingerprint/touch sensor formed on a display panel according to various example embodiments of the present disclosure.

Referring to FIG. 12, in an example embodiment, a touch screen module 1210 may include a window 1211, an adhesive layer 1212, a fingerprint/touch sensor 1213, and a display panel 1214.

The display panel 1214 is located under the window 1211, and the fingerprint/touch sensor 1213 may be formed on the top surface (e.g., the surface facing the window 1211) of the display panel 1214 to correspond to the display area 411a. The display panel 1214 may be attached to the bottom surface of the window 1211 with an adhesive (e.g., the adhesive layer 1212) such that the fingerprint/touch sensor 1213 formed thereon faces the window 1211. The fingerprint/touch sensor 1213 may have patterns with the same pitch and may detect a touch and a fingerprint from the entire display area 411a.

Figure 13:
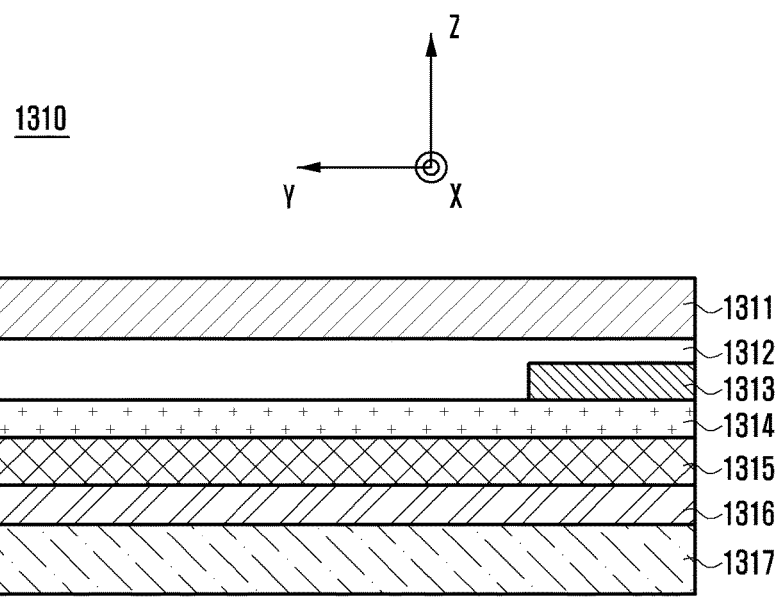
FIG. 13 is a cross section of a touch screen module having a touch sensor formed on a display panel and a fingerprint sensor located thereon according to various example embodiments of the present disclosure.

FIG. 13 is a cross section illustrating an example touch screen module having a touch sensor formed on a display panel and a fingerprint sensor located thereon according to various example embodiments of the present disclosure.

Referring to FIG. 13, in an example embodiment, a touch screen module 1310 may include a window 1311, a first adhesive layer 1312, a fingerprint sensor 1313, a substrate 1314, a second adhesive layer 1315, a touch sensor 1316, and a display panel 1317.

The substrate 1314 is located under the window 1311, and the fingerprint sensor 1313 may be formed on the top surface (e.g., the surface facing the window 1311) of the substrate 1314 to correspond to the fingerprint sensing area 411b. Alternatively, although not shown, the fingerprint sensor 1313 may be formed on the bottom surface of the substrate 1314. The substrate 1314 may be attached to the bottom surface of the window 1311 with an adhesive (e.g., the first adhesive layer 1312) such that the fingerprint sensor 1313 formed thereon faces the window 1311.

The display panel 1317 is located under the substrate 1314, and the touch sensor 1316 may be formed on the top surface (e.g., the surface facing the substrate 1314) of the display panel 1317 to correspond to the display area 411*a*. Namely, the display panel 1317 may act as a substrate for forming patterns of the touch sensor 1316. The display panel 1317 may be attached to the bottom surface of the substrate 1314 with an adhesive (i.e., the second adhesive layer 1315) such that the touch sensor 1316 formed thereon faces the substrate 1314.

Figure 14:
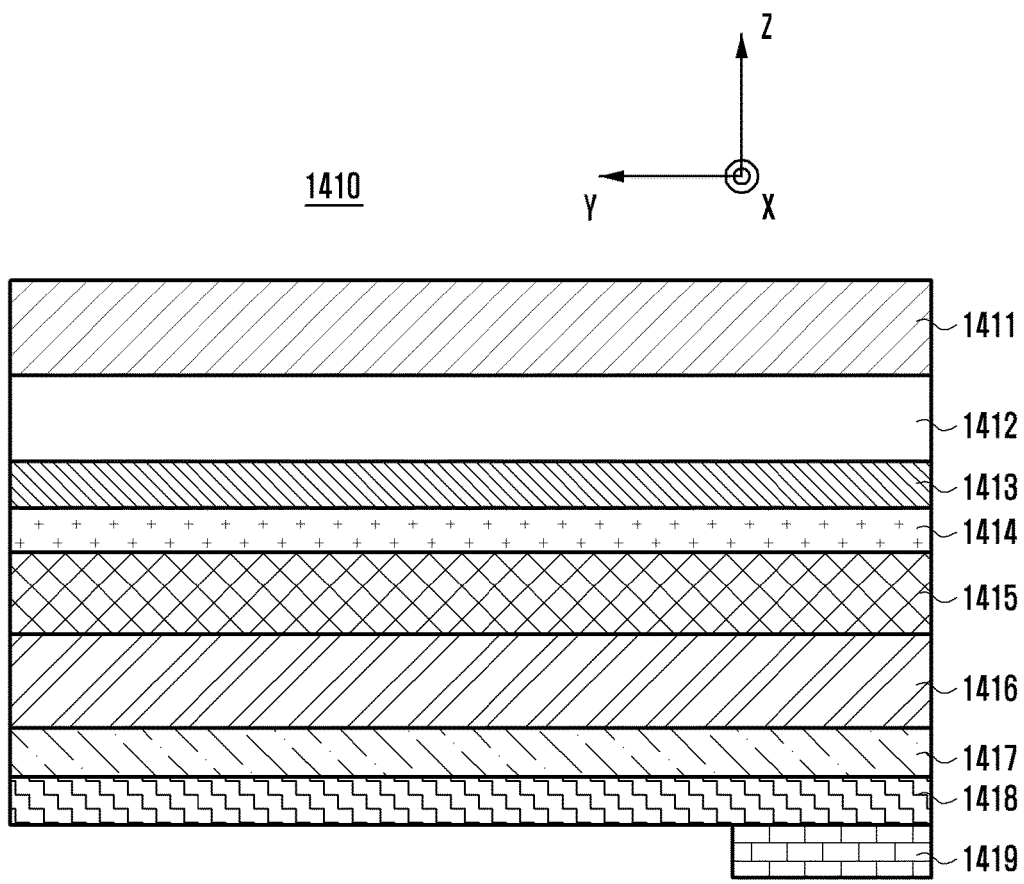
FIG. 14 is a cross section of a touch screen module having a fingerprint sensor located under a display panel according to various example embodiments of the present disclosure.

FIG. 14 is a cross section illustrating an example touch screen module having a fingerprint sensor located under a display panel according to various example embodiments of the present disclosure.

Referring to FIG. 14, in an example embodiment, a touch screen module 1410 may include a window 1411, a first adhesive layer 1412, a first substrate 1413, a touch sensor 1414, a second adhesive layer 1415, a display panel 1416, a third adhesive layer 1417, a second substrate 1418, and a fingerprint sensor 1419.

The first substrate 1413 may be located between the window 1411 and the display panel 1416. Namely, the top surface of the first substrate 1413 faces the window 1411, and the bottom surface of the first substrate 1413 faces the display panel 1416. The top surface of the first substrate 1413 may be attached to the bottom surface of the window 1411 with an adhesive (e.g., the first adhesive layer 1412). The bottom surface of the first substrate 1413 may have the touch sensor 1414 formed thereon to correspond to the display area 411*a* and attached to the top surface of the display panel 1416 with an adhesive (e.g., the second adhesive layer 1415). Here, although not shown, the touch sensor 1414 may be formed on the top surface of the first substrate 1413.

The second substrate 1418 is located under the display panel 1416, and the fingerprint sensor 1419 may be formed on a part of the bottom surface (e.g., the surface facing the display panel 1416) of the second substrate 1418. Here, the part of the second substrate 1418 may correspond to the fingerprint sensing area 411*b*. The top surface of the second substrate 1418 may be attached to the bottom surface of the display panel 1416 with an adhesive (e.g., the third adhesive layer 1417). Meanwhile, since the fingerprint sensor 1419 is located under the display panel 1416, the operation of the display panel 1416 may interfere with the electric force line generated by the fingerprint sensor 1419, thereby causing an error in sensing a fingerprint. Thus, the processor (e.g., 120 in FIG. 1 or 210 in FIG. 2) may control each controller to selectively activate the fingerprint sensor 1419 and the touch sensor 1414.

Figure 15:
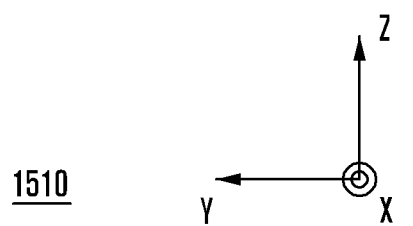
FIG. 15 is a cross section of a touch screen module having a fingerprint sensor and a touch sensor formed respectively on both surfaces of a substrate according to various example embodiments of the present disclosure.
Figure 15:
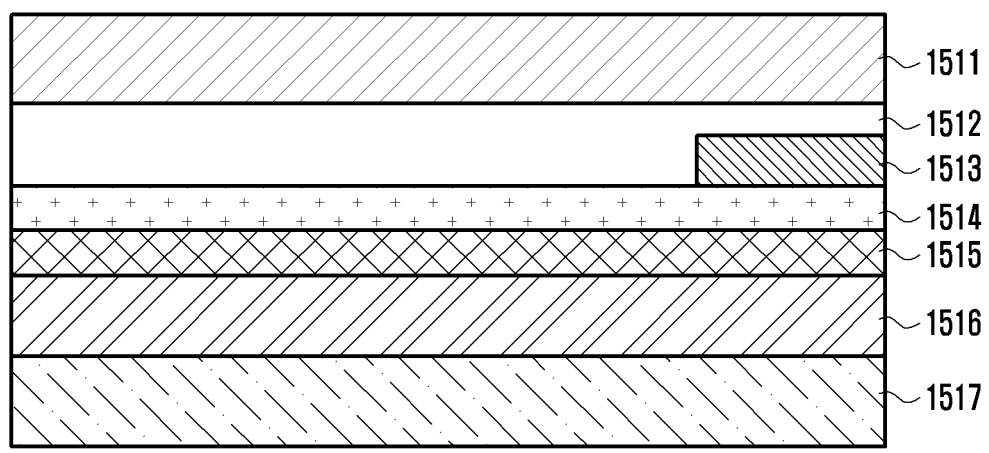

FIG. 15 is a cross section illustrating an example touch screen module having a fingerprint sensor and a touch sensor formed respectively on both surfaces of a substrate according to various example embodiments of the present disclosure.

Referring to FIG. 15, in an example embodiment, a touch screen module 1510 may include a window 1511, a first adhesive layer 1512, a fingerprint sensor 1513, a substrate 1514, a touch sensor 1515, a second adhesive layer 1516, and a display panel 1517.

The substrate 1514 is located under the window 1511, and the fingerprint sensor 1513 may be formed on the top surface (e.g., the surface facing the window 1511) of the substrate 1514 to correspond to the fingerprint sensing area 411*b*. Also, the touch sensor 1515 may be formed on the bottom surface of the substrate 1514 to correspond to the display area 411*a*. The substrate 1514 may be attached to the bottom surface of the window 1511 with an adhesive (e.g., the first adhesive layer 1512) such that the fingerprint sensor 1513 formed thereon faces the window 1511. Also, the substrate 1514 may be attached to the top surface of the display panel 1517 with an adhesive (e.g., the second adhesive layer 1516) such that the touch sensor 1515 formed thereon faces the display panel 1517. The processor (e.g., 120 in FIG. 1 or 210 in FIG. 2) may control each controller to selectively activate the fingerprint sensor 1513 and the touch sensor 1515. Meanwhile, although not shown, the touch sensor and the fingerprint sensor may be formed on the top surface and the bottom surface of the substrate 1514, respectively.

Figure 16:
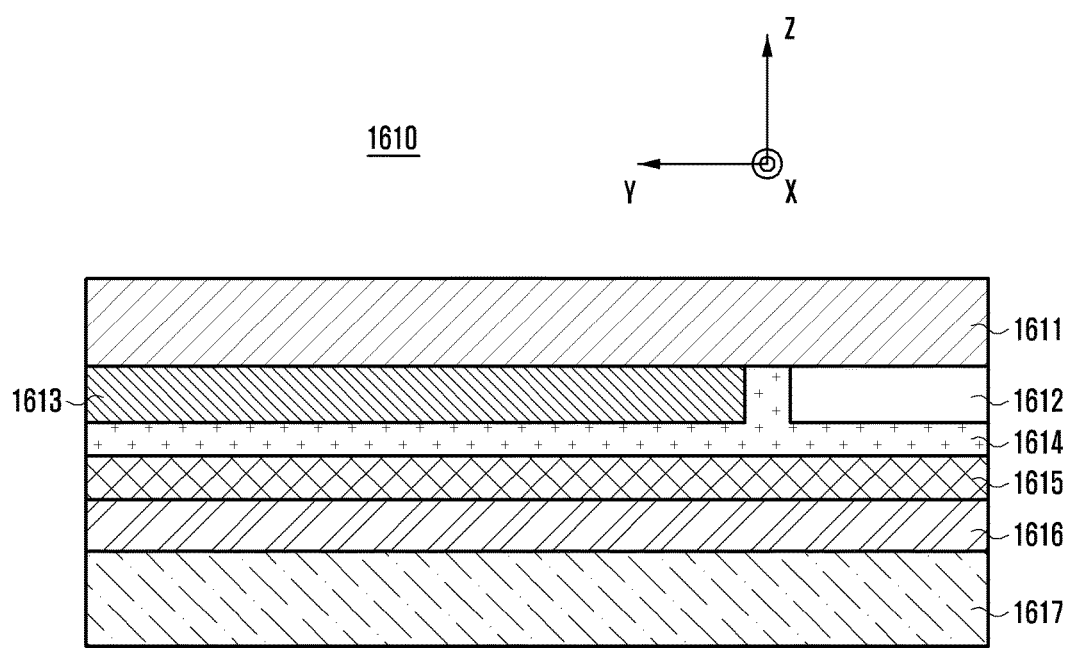
FIG. 16 is a cross section of a touch screen module according to various example embodiments of the present disclosure.

FIG. 16 is a cross section illustrating an example touch screen module according to various example embodiments of the present disclosure.

Referring to FIG. 16, in an example embodiment, a touch screen module 1610 may include a window 1611, a fingerprint sensor 1612, a touch sensor 1613, a first adhesive layer 1614, a glass layer 1615, a second adhesive layer 1616, and a display panel 1617.

The fingerprint sensor 1612 may be formed on a part (e.g., a first part) of the bottom surface (e.g., the surface facing the display panel 1617) of the window 1611, and the touch sensor 1613 may be formed on another part (e.g., a second part). Here, the first part may correspond to the fingerprint sensing area 411*b*, and the entire region including the first and second parts may correspond to the display area 411*a*. The fingerprint sensor 1612 may be used for detecting a touch from the fingerprint sensing area 411*b*.

As the window 1611 is designed thinner, the sensitivity of the fingerprint sensor 1612 may be improved. However, the strength of the touch screen module 1610 may be weakened as the design is thin. To compensate for this, the touch screen module 1610 may further include the glass layer 1615. For example, the glass layer 1615 is located between the window 1611 and the display panel 1617 such that the top surface thereof may be attached, with an adhesive (e.g., the first adhesive layer 1614), to the bottom surface of the window 1611 having the fingerprint sensor 1612 and the touch sensor 1613 formed thereon and also the bottom surface thereof may be attached to the top surface of the display panel 1617 with an adhesive (e.g., the second adhesive layer 1616). In addition, the glass layer 1615 may be included in the touch screen module 1610 for the purpose of increasing the overall thickness of the touch screen module 1610. The purpose of strength reinforcement or thickness increase may also be applied to any other touch screen panel. For example, the substrate 715 of FIG. 7 may be embodied as glass. In another example as illustrated in FIG. 8 or 9, the glass layer may be positioned between the window 811 or 911 and the display panel 815 or 914.

Figure 17A:
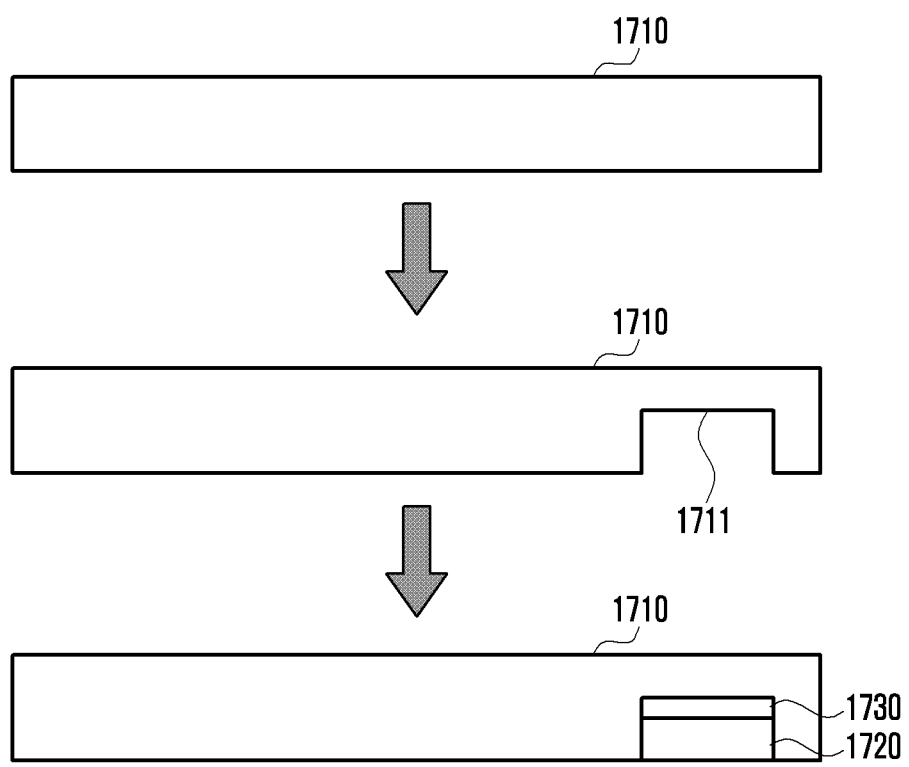
FIGS. 17A and 17B are diagrams illustrating an example method for forming a fingerprint sensor in a window according to various example embodiments of the present disclosure.
Figure 17B:
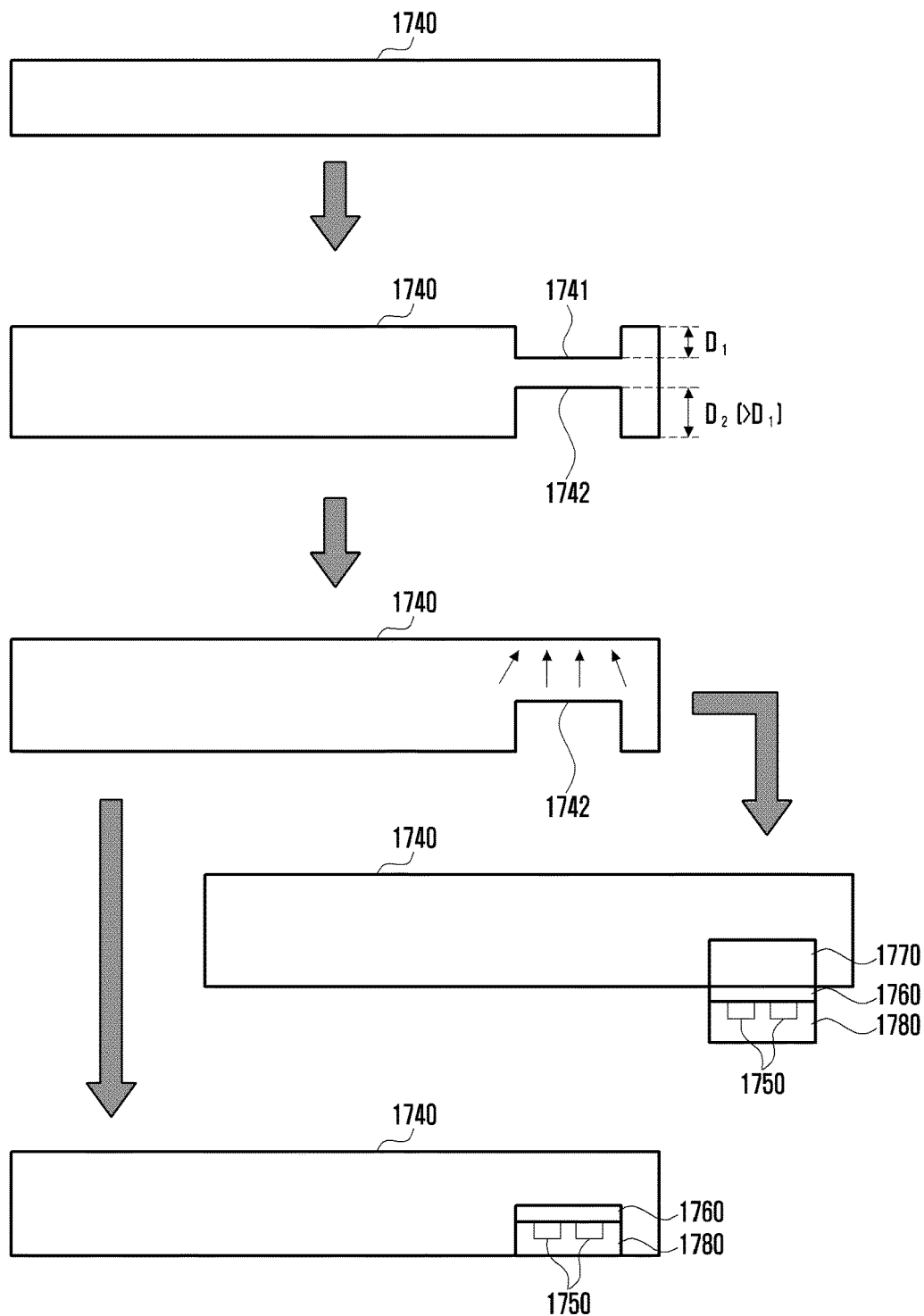

FIGS. 17A and 17B are diagrams illustrating an example method for forming a fingerprint sensor in a window according to various example embodiments of the present disclosure.

Referring to FIG. 17A, in an example embodiment, a window 1710 provided as one of elements of a touch screen module may be etched partially at the bottom surface thereof, thus forming an etched portion 1711. Then a substrate 1730 and a fingerprint sensor 1720 formed thereon may be inserted into and attached to the etched portion 1711 by, for example, a laminating technique. Therefore, the fingerprint sensor 1720 may be closer to a finger contact area (e.g., the fingerprint sensing area 411*b*), and the sensitivity of the fingerprint sensor 1720 may be improved. Meanwhile, before or after laminating, the window 1710 may be thermally treated, e.g., for reinforcement.

Referring to FIG. 17B, a window 1740 may be etched at a portion of the top surface thereof and at a corresponding portion of the bottom surface thereof, thus forming a first etched portion 1741 having an etching depth D1 from the top surface and a second etched portion 1742 having an etching depth D2 from the bottom surface. If the window 1740 is thermally treated in a state where the etching depth D1 is smaller than the etching depth D2, a pressure is concentrated to the first etched portion 1741 having a relatively lower depth. Therefore, the first etched portion 1741 may be planarized, and a convex phenomenon of the second etched portion 1742 may be alleviated. After thermal treatment, in an embodiment, a substrate 1760 having a fingerprint sensor 1750 may be inserted into and attached to the second etched portion 1742, and then an adhesive 1780 (e.g., liquid epoxy) may be applied to the second etched portion 1742 and cured in a vacuum. In another embodiment for improving sensitivity after thermal treatment, a transparent material 1770 (e.g., Sapphire (11.5), Zirconia ($ZnO_2$, 10~23), or high K Epoxy (150)) having a higher dielectric constant than the window 1740 may be filled in the second etched portion 1742 before the substrate 1760 having the fingerprint sensor 1750 is attached.

The window having the fingerprint sensor fabricated according to above process may be applied to various kinds of the above-described touch screen modules. For example, the window 711 and the fingerprint sensor 712 of FIG. 7, the window 811 and the fingerprint sensor 812 of FIG. 8, or the window 1611 and the fingerprint sensor 1612 of FIG. 16 may be replaced by the window 1710 or 1740 of FIG. 17A or 17B.

Figure 18:
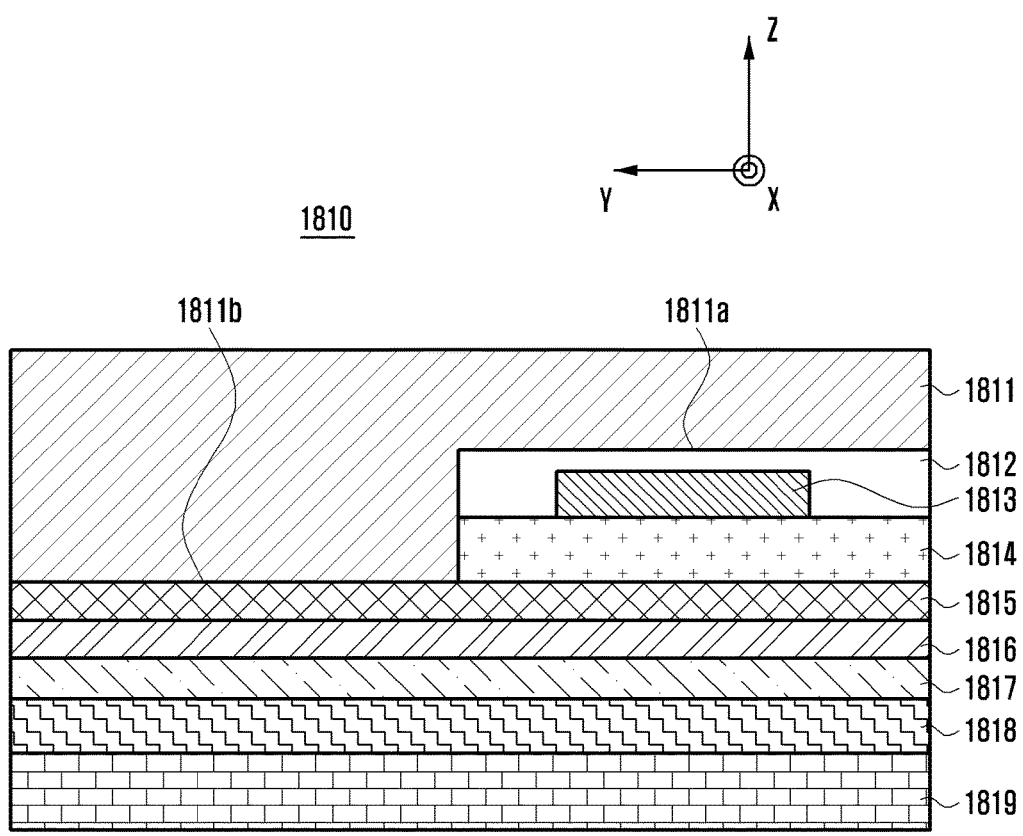
FIG. 18 is a cross section of a touch screen module having a window with a fingerprint sensor formed therein according to various example embodiments of the present disclosure.

FIG. 18 is a cross section illustrating an example touch screen module having a window with a fingerprint sensor formed therein according to various example embodiments of the present disclosure.

Referring to FIG. 18, in an example embodiment, a touch screen module 1810 may include a window 1811, a first adhesive layer 1812, a fingerprint sensor 1813, a first substrate 1814, a second adhesive layer 1815, a touch sensor 1816, a second substrate 1817, a third adhesive layer 1818, and a display panel 1819.

The top surface of the window 1811 may be designed to be flat and the bottom surface thereof to have a height difference. For example, when viewed from the display panel 1819, a first part 1811*a* of the bottom surface may be lower than a second part 1811*b* and may correspond to the fingerprint sensing area 411*b*.

The first substrate 1814 is located under the first part 1811*a* of the window 1811, and the fingerprint sensor 1813 may be formed on the top surface (e.g., the surface facing the first part 1811*a*) of the first substrate 1814. Further, the first substrate 1814 may be attached to the first part 1811*a* with an adhesive (e.g., the first adhesive layer 1812) such that the fingerprint sensor 1813 formed thereon faces the first part 1811*a*.

The second substrate 1817 is located under window 1811 to which the first substrate 1814 is attached. The touch sensor 1816 may be formed on the top surface (e.g., the surface facing the window 1811) of the second substrate 1817 to correspond to the display area 411*a*. Alternatively, although not shown, the touch sensor 1816 may be formed on the bottom surface of the second substrate 1817. Also, the second substrate 1817 may be attached to the bottom surface of the window 1811 with an adhesive (e.g., the second adhesive layer 1815) such that the touch sensor 1816 formed thereon faces the window 1811. Further, the second substrate 1817 may be made of glass for strength reinforcement.

The display panel 1819 is located under the second substrate 1817 and may be attached to the bottom surface of the second substrate 1817 with an adhesive (e.g., the third adhesive layer 1818).

The touch screen module 1810 may further include a glass layer (not shown) for strength reinforcement. For example, the glass layer may be positioned between the window 1811 and the touch sensor 1816.

Figure 19A:
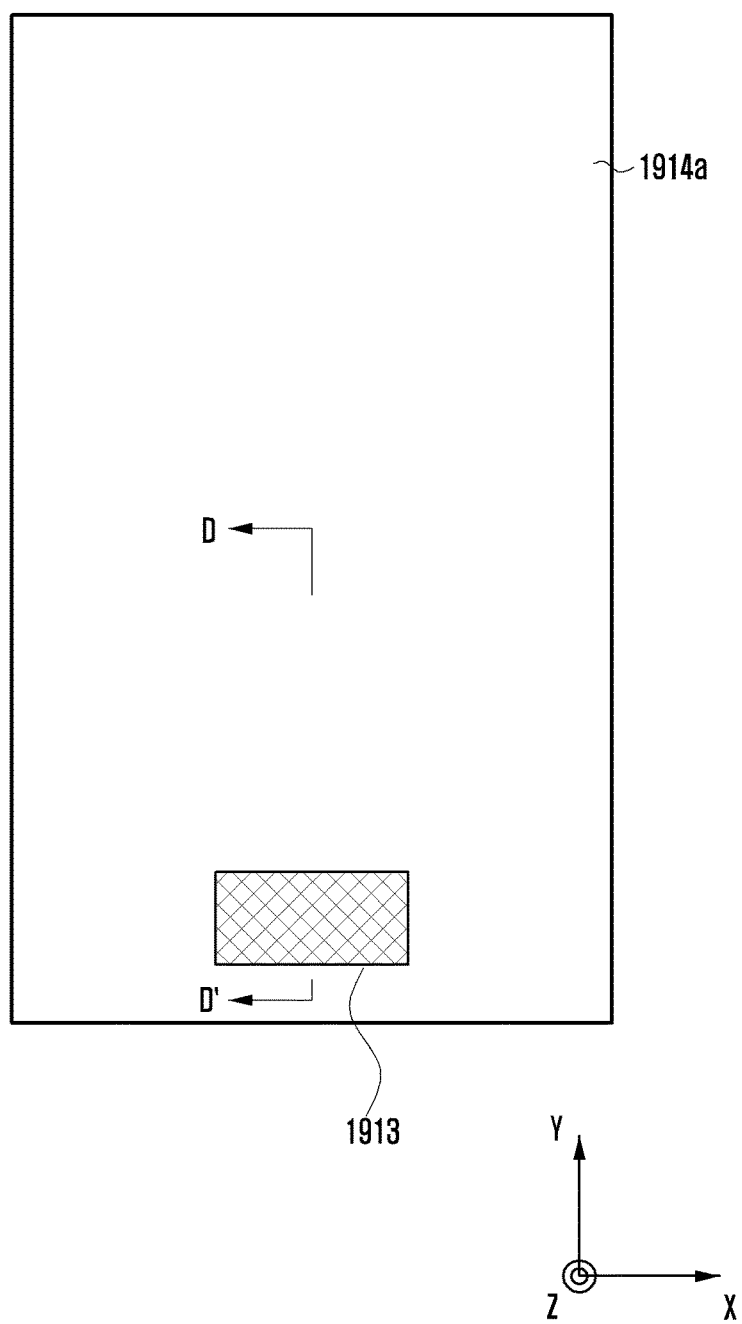
FIGS. 19A, 19B and 19C are diagrams illustrating an example touch screen module having a substrate with conductive vias formed therein according to various example embodiments of the present disclosure.
Figure 19B:
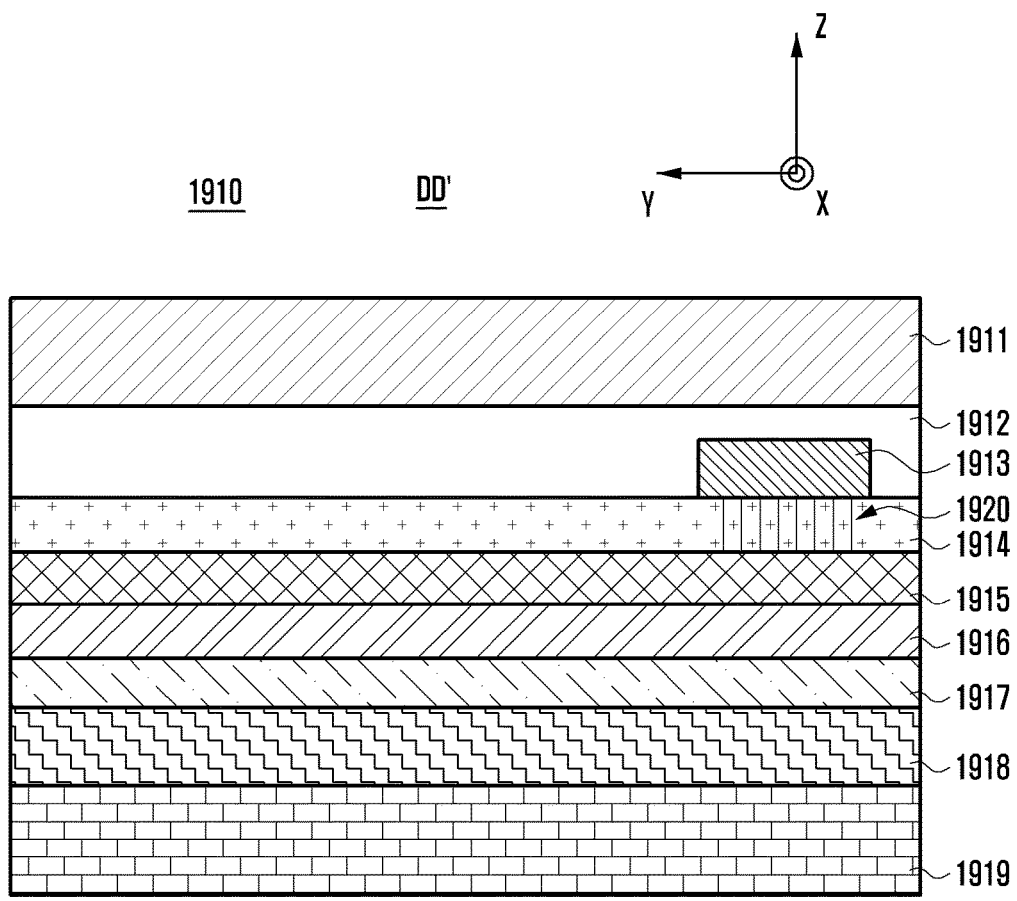
Figure 19C:
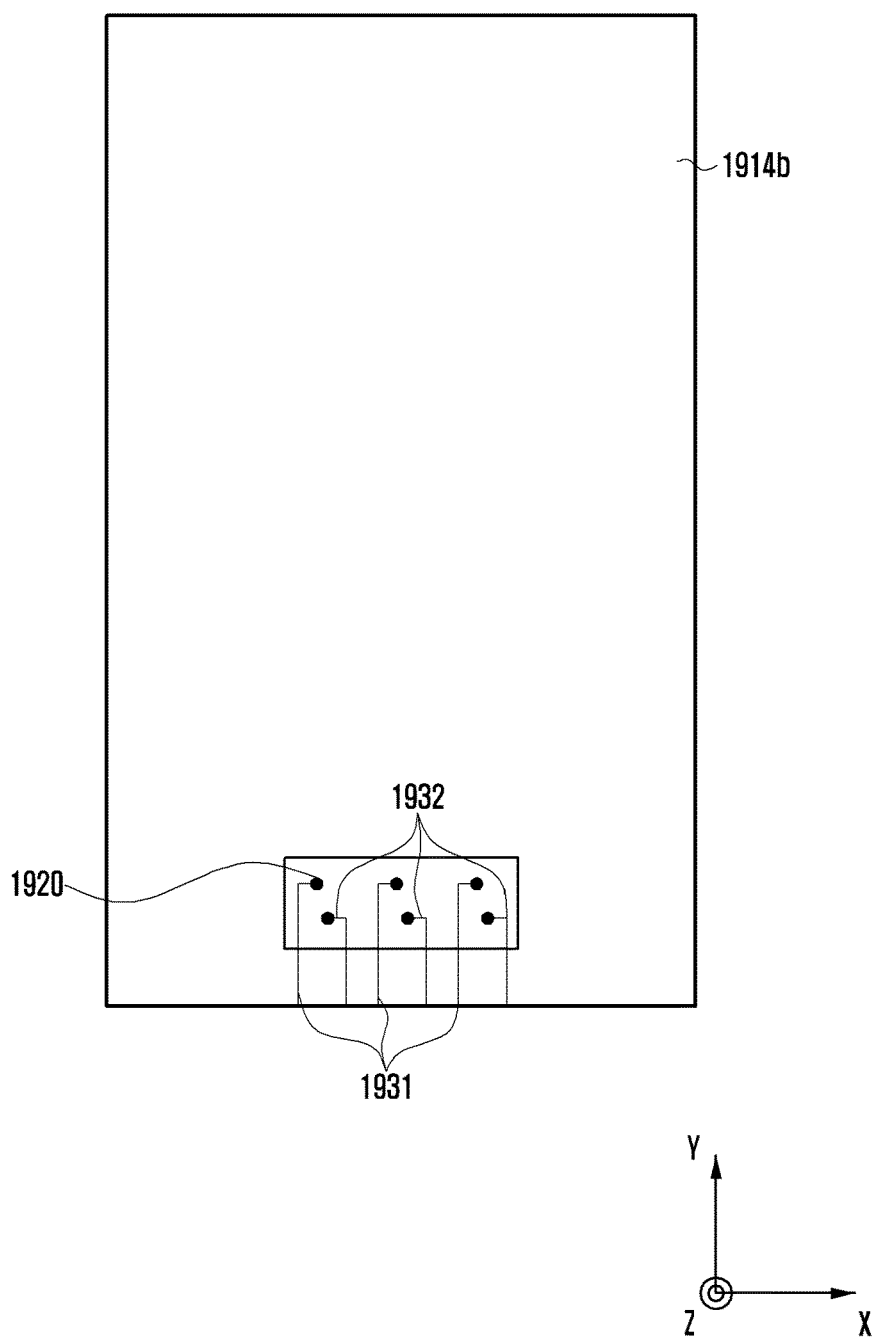

FIGS. 19A, 19B and 19C are diagrams illustrating an example touch screen module having a substrate with conductive vias formed therein according to various example embodiments of the present disclosure. Specifically, FIG. 19A shows the top surface of the substrate on which a fingerprint sensor is formed, FIG. 19B is a cross section of the touch screen module, and FIG. 19C shows the bottom surface of the substrate on which input and output wirings are formed.

Referring to FIGS. 19A, 19B and 19C, in an example embodiment, a touch screen module 1910 may include a window 1911, a first adhesive layer 1912, a fingerprint sensor 1913, a first substrate 1914, a second adhesive layer 1915, a touch sensor 1916, a second substrate 1917, a third adhesive layer 1918, and a display panel 1919.

The first substrate 1914 is located under the window 1911, and the fingerprint sensor 1913 may be formed on a part of the top surface 1914*a* of the first substrate 1914. Further, input wirings 1931 and output wirings 1932 may be formed on a part of the bottom surface 1914*b* of the first substrate 1914. In addition, conductive vias 1920 may be formed in the first substrate 1914. The fingerprint sensor 1913 formed on the top surface 1914*a* may be electrically connected to the input/output wirings 1931 and 1932 formed on the bottom surface 1914*b* through the vias 1920.

As earlier described in FIG. 4, the input/output wirings 491 and 492 are formed on the same layer as the fingerprint sensor 423 and also occupy some regions around the fingerprint sensor 423. Therefore, no touch input may be sensed in such regions, and this may often cause a noise in a fingerprint detection. Alternatively to FIG. 4, the input/output wirings 1931 and 1932 of FIG. 19 are formed on the opposite surface of the substrate on which the fingerprint sensor 1913 is formed. Namely, the input/output wirings 1931 and 1932 are formed on the surface facing the display panel 1919 and thus do not invade the existing touch sensor area. Therefore, this wiring arrangement may prevent and/or reduce a reduction in a touch sensing function, and also enhance sensitivity because of a shorter wiring length from the fingerprint sensor 1913 to a fingerprint controller (not shown). The input/output wirings 1931 and 1932 may be electrically connected to the controller (not shown) for controlling the fingerprint sensor 1913. The first substrate 1914 may be attached to the bottom surface of the window 1911 with an adhesive (i.e., the first adhesive layer 1912) such that the fingerprint sensor 1913 formed thereon faces the window 1911.

The second substrate 1917 is located under the first substrate 1914, and the touch sensor 1916 may be formed on at least a part (corresponding to the display region 411*a*) of the top surface (e.g., the surface facing the first substrate 1914) of the second substrate 1917. Alternatively, although not shown, the touch sensor 1916 may be formed on the bottom surface of the second substrate 1917. Also, the second substrate 1917 may be attached to the bottom surface of the first substrate 1914 with an adhesive (e.g., the second adhesive layer 1915) such that the touch sensor 1916 formed thereon faces the first substrate 1914.

The display panel 1919 is located under the second substrate 1917 and may be attached to the bottom surface of the second substrate 1917 with an adhesive (i.e., the third adhesive layer 1918).

Figure 20A:
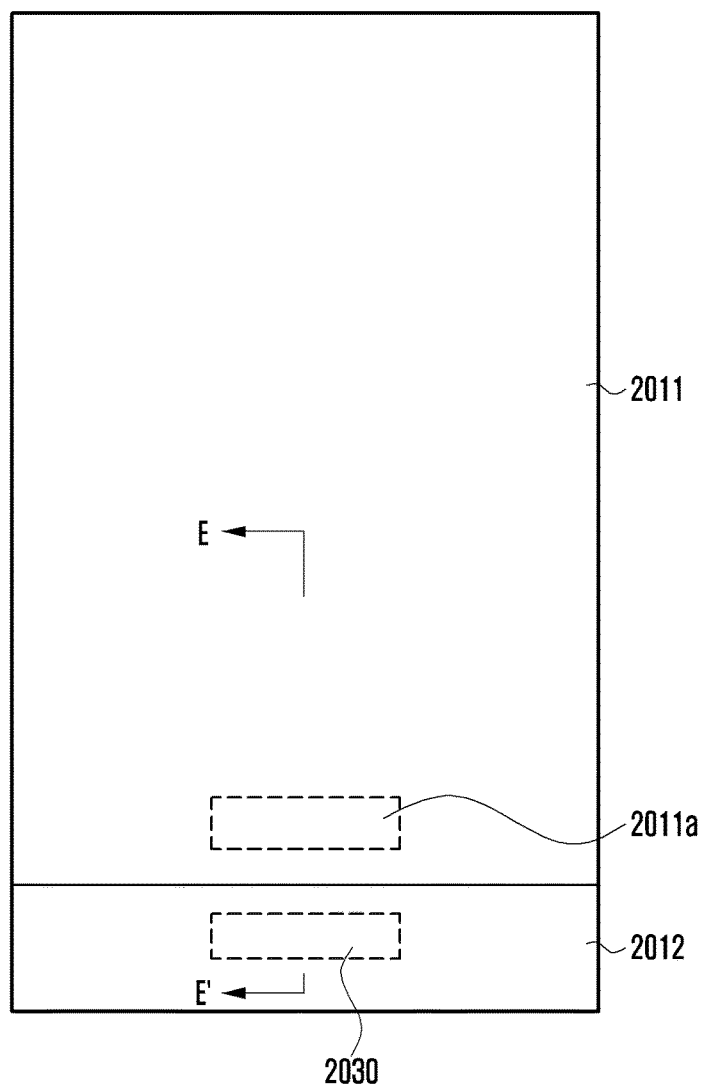
FIGS. 20A and 20B are diagrams illustrating an example touch screen module having a fingerprint sensor controller according to various example embodiments of the present disclosure.
Figure 20B:
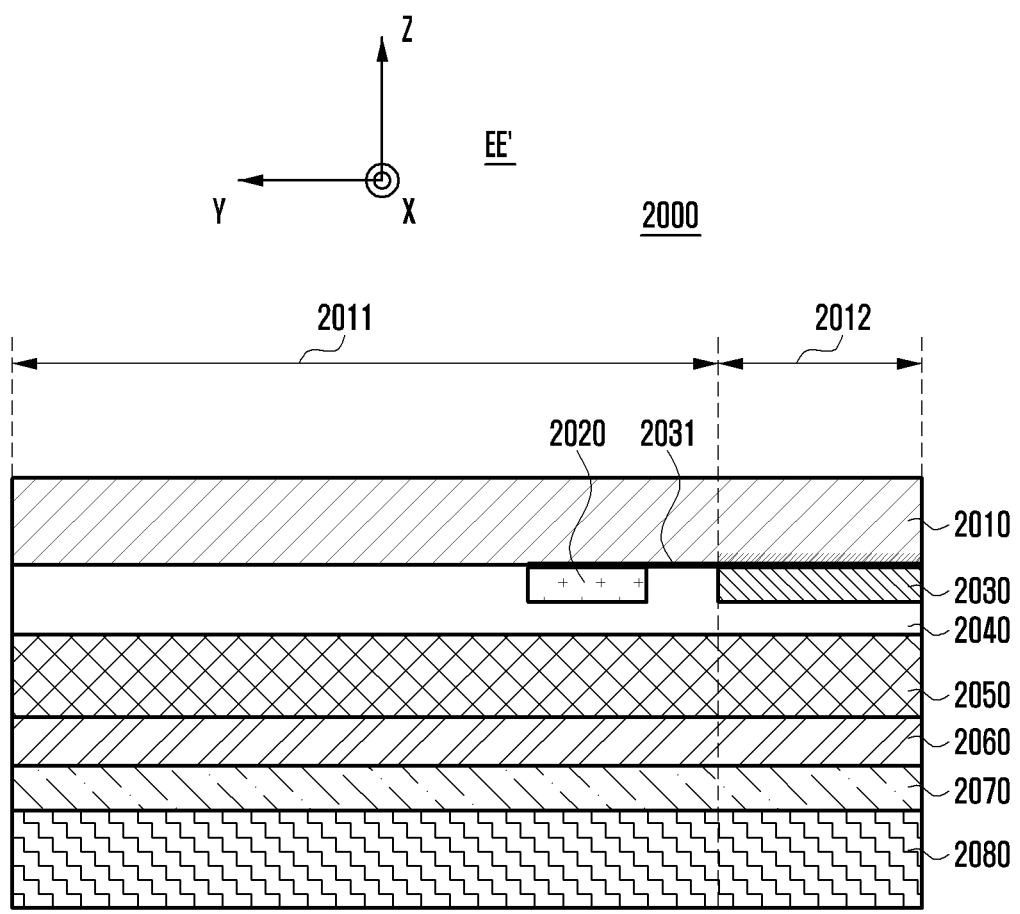

FIGS. 20A and 20B are diagrams illustrating an example touch screen module having a fingerprint sensor controller according to various example embodiments of the present disclosure. Specifically, FIG. 20A shows a front view of the touch screen module, and FIG. 20B is a cross section of the touch screen module.

Referring to FIGS. 20A and 20B, in an example embodiment, a touch screen module 2000 may include a window 2010, a fingerprint sensor 2020, a fingerprint sensor controller 2030, a first adhesive layer 2040, a touch sensor 2050, a substrate 2060, a second adhesive layer 2070, and a display panel 2080.

The window 2010 may be formed of various transparent materials such as plastic or glass.

The fingerprint sensor 2020 may be formed on a part of the bottom surface of the window 2010. The part may be an area located under a fingerprint sensing area 2011a. The fingerprint sensor controller 2030 may be formed on another part of the bottom surface of the window 2010. This another part may be an area located under a non-display area, namely, a black matrix (BM) area 2012, so that the fingerprint sensor controller 2030 may be printed invisible. A wiring 2031 may electrically connect the fingerprint sensor 2020 and the fingerprint sensor controller 2030. The fingerprint sensor controller 2030 is arranged closer to the fingerprint sensor 2020 as compared with the fingerprint sensor controller 431 of FIG. 4, and thus the wiring 2031 may be designed to be short. The shorter the wiring, the smaller the parasitic resistance and capacitance. Therefore, the sensitivity of the fingerprint sensor 2020 may be improved.

All of the fingerprint sensor 2020, the fingerprint sensor controller 2030, and the wiring 2031 are conductive elements and may be transparent. Therefore, in another embodiment, these elements 2020, 2030, and 2031 may be located under the display area 2011 rather than under the BM area 2012. In addition, the BM area 2012 may not be printed, and the entire window 2010 may form the display area.

According to another embodiment, the fingerprint sensor 2020 or at least some patterns thereof may be formed on the window 2010. In this case, a protective layer (e.g., a film) may be formed on the fingerprint sensor 2020 or some patterns thereof.

The substrate 2060 is located under the window 2010, and the touch sensor 2050 may be formed on the top surface (e.g., the surface facing the window 2010) of the substrate 2060 to correspond to the display area 2011 or both the display area 2011 and the BM area 2012. Alternatively, although not shown, the touch sensor 2050 may be formed on the bottom surface of the substrate 2060. The substrate 2060 may be attached to the bottom surface of the window 2010 with an adhesive (e.g., the first adhesive layer 2040) such that the touch sensor 2050 formed thereon faces the window 2010 and is insulated from the fingerprint sensor 2020.

The display panel 2080 is located under the substrate 2060 and may be attached to the bottom surface of the substrate 2060 with an adhesive (e.g., the second adhesive layer 2070).

Figure 21A:
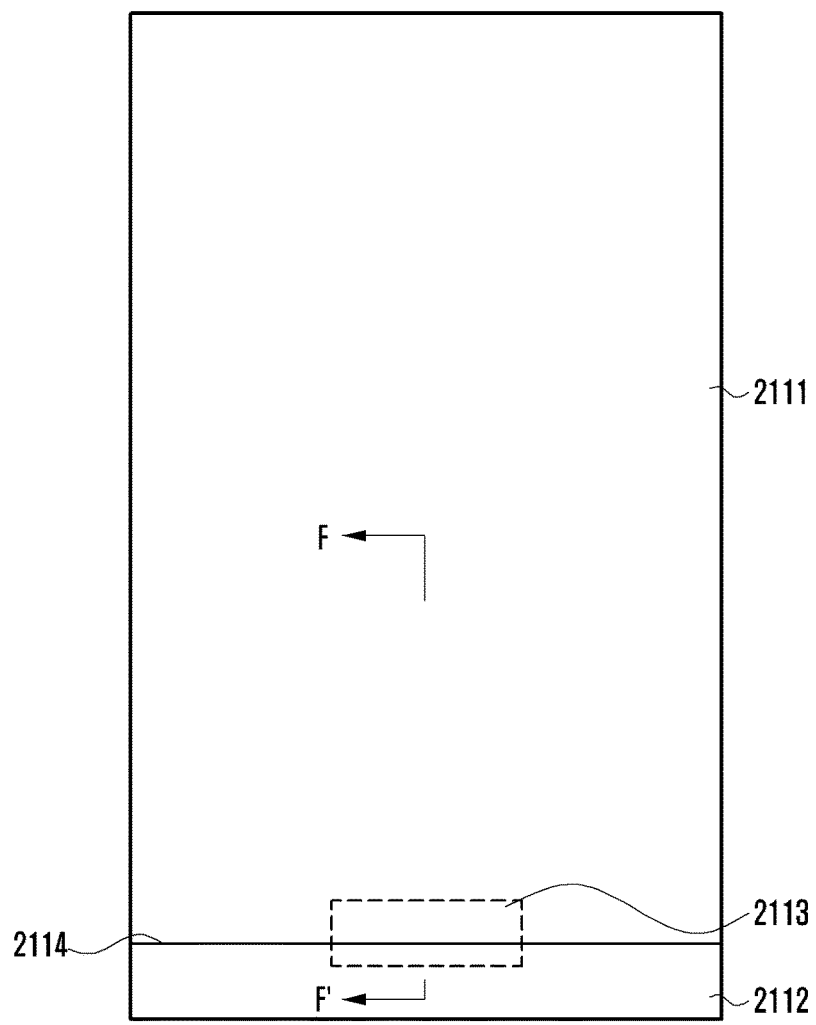
FIGS. 21A and 21B are diagrams illustrating an example touch screen module having a fingerprint sensor controller according to various example embodiments of the present disclosure.
Figure 21B:
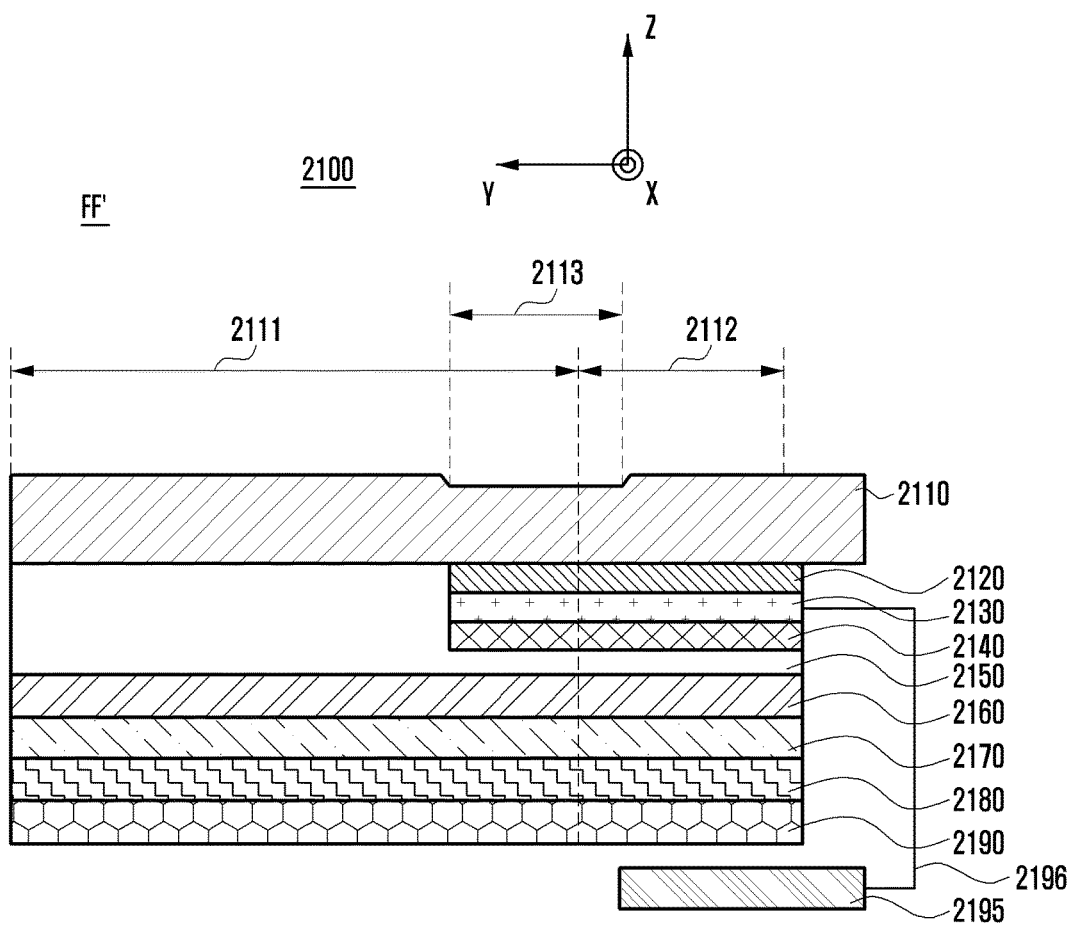

FIGS. 21A and 21B are diagrams illustrating an example touch screen module having a fingerprint sensor controller according to various example embodiments of the present disclosure. Specifically, FIG. 21A shows a front view of the touch screen module, and FIG. 21B is a cross section of the touch screen module.

Referring to FIGS. 21A and 21B, in an example embodiment, a touch screen module 2100 may include a window 2110, a first adhesive layer 2120, a fingerprint sensor 2130, a first substrate 2140, a second adhesive layer 2150, a touch sensor 2160, a second substrate 2170, a third adhesive layer 2180, a display panel 2190, and a fingerprint sensor controller 2195.

The window 2110 may be formed of various transparent materials, and the top surface thereof may be divided into a display area 2111 and a BM area 2112. Also, the window 2110 may be etched at a part of the top surface corresponding to a fingerprint sensing area 2113 such that a user can recognize the fingerprint sensing area 2113. As shown, based on a boundary 2114 for distinguishing the display area 2111 and the BM area 2112, a part of the display area 2111 and a part of the BM area 2112 may be the fingerprint sensing area 2113.

The fingerprint sensor 2130 may be located under the fingerprint sensing area 2113. For example, the fingerprint sensor 2130 may be formed on the top surface (or on the bottom surface although not shown) of the first substrate 2140, and the first substrate 2140 may be attached to the bottom surface of the window 2110 with an adhesive (e.g., the first adhesive layer 2120). Therefore, the fingerprint sensor 2130 may create a signal in response to the contact of a fingerprint on the fingerprint sensing area 2113 and output the signal to the fingerprint sensor controller 2195.

The touch sensor 2160 may be located under the display area 2111. For example, the touch sensor 2160 may be formed on the top surface (or the bottom surface) of the second substrate 2170, and the second substrate 2170 may be attached, with an adhesive (e.g., the second adhesive layer 2150), to the bottom surface of the window 2110 to which the first substrate 2140 is attached. Therefore, the touch sensor 2160 create a signal in response to the contact of an object on the display area 2111 and output the signal.

The display panel 2190 is located under the second substrate 2170 and may be attached to the bottom surface of the second substrate 2170 with an adhesive (e.g., the third adhesive layer 2180).

The fingerprint sensor controller 2195 may be located under the display panel 2190 and may be electrically connected to the fingerprint sensor 2130 via an FPCB 2196. Here, the FPCB 2196 may be located under the BM region 2112.

According to various embodiments of the present disclosure, an electronic device may comprise a housing, a touch screen module, and a processor. The housing may include a first surface facing a first direction, a second surface facing a second direction opposite to the first direction, and a side member including a side surface surrounding at least a part of a space between the first surface and the second surface. The touch screen module may be exposed through at least a part of the first surface. The processor may be located in the housing and electrically coupled to the touch screen module.

In the electronic device, at least a part of the first surface may be a display area, and at least a part of the display area may be a fingerprint sensing area.

In the electronic device, the touch screen module may include a window configured to form the display area, a display panel located under the display area in the space so as to output an image through the display area, a touch sensor located under the display area in the space so as to output a signal in response to contact of an conductive object on the display area, and a fingerprint sensor located under the fingerprint sensing area in the space so as to output a signal in response to contact of a fingerprint on the fingerprint sensing area.

The fingerprint sensor may be formed on a part of a bottom surface of the window. The part of the bottom surface of the window may be a region located under the fingerprint sensing area, and the bottom surface of the window may face a direction opposite the display area.

The part of the bottom surface of the window may be formed lower than another part of the bottom surface of the window when viewed from the second surface. A substrate on which the fingerprint sensor is formed may be attached to the part of the bottom surface of the window.

The part of the bottom surface of the window may be formed lower than another part of the bottom surface of the window when viewed from the second surface. A transparent dielectric material may be filled in the part of the bottom surface of the window, and a substrate on which the fingerprint sensor is formed may be attached to the transparent dielectric material.

The touch screen module may further include a substrate and vias, and the vias may electrically connect the fingerprint sensor formed on one surface of the substrate and wirings formed on another surface of the substrate.

The touch screen module may further include a controller electrically connected to the fingerprint sensor, and the controller may be attached to a part of a bottom surface of the window located outside the display area.

The part of the bottom surface of the window may be printed so that the controller is not exposed.

The touch screen module may further include a first substrate located under the window and having the fingerprint sensor formed thereon, and a second substrate located between the first substrate and the display panel and having the touch sensor formed thereon.

The touch screen module may further include a substrate located between the window and the display panel. The touch sensor may be formed on a first part of one surface of the substrate, and the fingerprint sensor may be formed on a second part of the one surface of the substrate, the second part being different from the first part. The first and second parts may correspond to an entire region located under the display area, and the second part may be a region located under the fingerprint sensing area. The fingerprint sensor may output a signal in response to contact of the conductive object on the fingerprint sensing area.

The touch screen module may further include a substrate located between the window and the display panel. The touch sensor may be formed on one surface of the substrate, and at least a part of patterns of the touch sensor may be used as the fingerprint sensor.

The touch screen module may further include a substrate located between the window and the display panel and having the touch sensor formed thereon. The fingerprint sensor may be formed on a part of a bottom surface of the window, and the bottom surface of the window may face a direction opposite to the display area.

The touch sensor may be formed on a first part of a bottom surface of the window, and the fingerprint sensor may be formed on a second part of the bottom surface of the window, the second part being different from the first part. The first and second parts may correspond to an entire region located under the display area, and the second part may be a region located under the fingerprint sensing area. The fingerprint sensor may output a signal in response to contact of the conductive object on the fingerprint sensing area, and the bottom surface of the window may face a direction opposite to the display area.

The touch sensor may be formed on a bottom surface of the window. At least a part of patterns of the touch sensor may be used as the fingerprint sensor, and the bottom surface of the window may face a direction opposite to the display area.

The touch screen module may further include a substrate located between the window and the display panel and having the touch sensor formed thereon. The fingerprint sensor may be formed on a part of a top surface of the display panel, and the top surface of the display panel may face the window.

The touch sensor may be formed on a first part of a top surface of the display panel, and the fingerprint sensor may be formed on a second part of the top surface of the display panel, the second part being different from the first part. The first and second parts may correspond to an entire region located under the display area, and the second part may be a region located under the fingerprint sensing area. The fingerprint sensor may output a signal in response to contact of the conductive object on the fingerprint sensing area, and the top surface of the display panel may face the window.

The touch sensor may be formed on a top surface of the display panel. At least a part of patterns of the touch sensor may be used as the fingerprint sensor, and the top surface of the display panel may face the window.

The touch screen module may further include a substrate located between the window and the display panel and having the fingerprint sensor formed thereon. The touch sensor may be formed on a top surface of the display panel, and the top surface of the display panel may face the window.

The touch screen module may further include a first substrate located between the window and the display panel and having the touch sensor formed thereon, and a second substrate located under the display panel and having the fingerprint sensor formed thereon.

The touch screen module may further include a substrate located between the window and the display panel. The fingerprint sensor may be formed on a part of one surface of the substrate, and the touch sensor may be formed on another surface of the substrate. The window and the substrate may be formed of glass.

The touch screen module may further include a glass layer located between the window and the display panel, and the window may be formed of glass.

While the present disclosure has been illustrated and described with reference to various example embodiments thereof, it will be understood by those skilled in the art that various changes in form and details may be made therein without departing from the scope of the disclosure as defined by the appended claims and their equivalents.

What is claimed is:
1. An electronic device comprising:
   a window configured to form a first surface of the electronic device facing a first direction, wherein at least a part of the first surface is a display area, and at least a part of the display area is a fingerprint sensing area;
   a display panel disposed under the display area in a space between the first surface and a second surface of the electronic device facing a second direction opposite the first direction and configured to output an image through the display area;

a touch sensor disposed under the display area in the space and configured to output a signal in response to contact of a conductive object on the display area; and a fingerprint sensor disposed under the fingerprint sensing area in the space and configured to output a signal in response to contact of a fingerprint on the fingerprint sensing area, wherein the fingerprint sensor is disposed on part of a bottom surface of the window, wherein the part of the bottom surface of the window is a region located under the fingerprint sensing area, wherein the bottom surface of the window faces a direction opposite the display area, wherein the part of the bottom surface of the window is lower than another part of the bottom surface of the window when viewed from the second surface, and wherein a substrate on which the fingerprint sensor is disposed is attached to the part of the bottom surface of the window.

2. The electronic device of claim 1, wherein the part is etched at the bottom surface of the window, and the substrate and the fingerprint sensor are attached to the etched part.

3. The electronic device of claim 1,
wherein the part of the bottom surface of the window is filled in with a transparent dielectric material, and
wherein the substrate is attached to the transparent dielectric material.

4. The electronic device of claim 1, wherein the electronic device further includes another substrate having vias extending therethough, and
wherein the vias are configured to electrically connect the fingerprint sensor disposed on one surface of the substrate and wirings formed on another surface of other the substrate.

5. The electronic device of claim 1, wherein the electronic device further includes a controller electrically connected to the fingerprint sensor, and
wherein the controller is attached to a part of a bottom surface of the window located outside the display area.

6. The electronic device of claim 5, wherein the part of the bottom surface of the window is printed so that the controller is not exposed.

7. The electronic device of claim 1, wherein the electronic device further includes:
a first substrate disposed under the window and having the fingerprint sensor disposed thereon, and
a second substrate disposed between the first substrate and the display panel and having the touch sensor disposed thereon.

8. The electronic device of claim 1, wherein the electronic device further includes another substrate disposed between the window and the display panel,
wherein the touch sensor is disposed on a first part of one surface of the other substrate, and the fingerprint sensor is formed on a second part of the one surface of other the substrate, the second part being different from the first part,
wherein the first and second parts define an entire region located under the display area,
wherein the second part is a region located under the fingerprint sensing area, and
wherein the fingerprint sensor outputs a signal in response to contact of the conductive object on the fingerprint sensing area.

9. The electronic device of claim 1, wherein the electronic device further includes another substrate disposed between the window and the display panel,
wherein the touch sensor is disposed on one surface of the other substrate, and
wherein at least a part of patterns of the touch sensor is configured to be used as the fingerprint sensor.

10. The electronic device of claim 1, wherein the electronic device further includes a substrate disposed between the window and the display panel and having the touch sensor disposed thereon.

11. The electronic device of claim 1, wherein the touch sensor is disposed on another part of the bottom surface of the window, the other part being different from the part,
wherein the parts define an entire region located under the display area,
wherein the fingerprint sensor is configured to output a signal in response to contact of the conductive object on the fingerprint sensing area.

12. The electronic device of claim 1, wherein the touch sensor is disposed on a bottom surface of the window,
wherein at least a part of patterns of the touch sensor are configured to be used as the fingerprint sensor.

13. The electronic device of claim 1, wherein the electronic device further includes a substrate disposed between the window and the display panel and having the fingerprint sensor disposed thereon,
wherein the touch sensor is disposed on a top surface of the display panel, and
wherein the top surface of the display panel faces the window.

14. The electronic device of claim 1, wherein the electronic device further includes another substrate disposed between the window and the display panel,
wherein the fingerprint sensor is disposed on a part of one surface of the other substrate,
wherein the touch sensor is disposed on another surface of the other substrate, and
wherein the window and the substrate are formed of glass.

15. The electronic device of claim 1, wherein the electronic device further includes a glass layer disposed between the window and the display panel, and
wherein the window is formed of glass.

* * * * *